United States Patent
Itoh et al.

(10) Patent No.: US 8,678,694 B2
(45) Date of Patent: Mar. 25, 2014

(54) AIRCRAFT REACTION LINK

(75) Inventors: Koji Itoh, Gifu (JP); Toshiaki Ogawa, Gifu (JP); Makoto Nagashima, Gifu (JP)

(73) Assignee: Nabtesco Corporation, Tokyo (JP)

( * ) Notice: Subject to any disclaimer, the term of this patent is extended or adjusted under 35 U.S.C. 154(b) by 621 days.

(21) Appl. No.: 12/954,140

(22) Filed: Nov. 24, 2010

(65) Prior Publication Data

US 2011/0139938 A1 Jun. 16, 2011

(30) Foreign Application Priority Data

Dec. 11, 2009 (JP) .................................. 2009-281372

(51) Int. Cl.
*F16C 11/06* (2006.01)
*F16J 1/16* (2006.01)

(52) U.S. Cl.
USPC .......... 403/157; 403/161; 244/99.2; 244/99.5

(58) Field of Classification Search
USPC ............... 403/157–163; 244/99.2, 99.3, 99.5, 244/99.6, 213, 215; 74/519, 522.5, 579 R, 74/586
See application file for complete search history.

(56) References Cited

U.S. PATENT DOCUMENTS

| | | | | |
|---|---|---|---|---|
| 519,458 A | * | 5/1894 | Shepheard | 74/586 |
| 524,522 A | * | 8/1894 | Bourne | 74/546 |
| 1,036,047 A | * | 8/1912 | Wilcox | 74/38 |
| 2,387,492 A | * | 10/1945 | Blaylock et al. | 244/217 |
| 2,869,386 A | * | 1/1959 | Hoover | 74/89.37 |
| 2,920,500 A | * | 1/1960 | Edman | 74/491 |
| 3,556,439 A | * | 1/1971 | Autry et al. | 244/210 |
| 4,231,284 A | | 11/1980 | Smith et al. | |
| 4,445,655 A | * | 5/1984 | Hueberger | 244/214 |
| 4,531,448 A | | 7/1985 | Barnes | |
| 4,836,044 A | * | 6/1989 | Lobig | 74/579 E |
| 4,930,983 A | | 6/1990 | Byrnes et al. | |

(Continued)

FOREIGN PATENT DOCUMENTS

| | | |
|---|---|---|
| JP | S55-33972 A | 3/1980 |
| JP | S60-260702 A | 12/1985 |

(Continued)

OTHER PUBLICATIONS

An Office Action; "Notice of Reasons for Refusal," issued by the Japanese Patent Office on Sep. 4, 2013, which corresponds to Japanese Patent Application No. 2009-281372 and is related to U.S. Appl. No. 12/954,140; with Concise Explanation.

*Primary Examiner* — Gregory Binda
*Assistant Examiner* — Nahid Amiri
(74) *Attorney, Agent, or Firm* — Studebaker & Brackett PC

(57) ABSTRACT

An aircraft reaction link includes a pair of linear portions, a coupling portion that couples ends of the pair of linear portions on the same side to each other, a fulcrum shaft attachment portion, and a cylinder attachment portion. A metal frame that is made of a metallic material and that is provided so as to extend across the coupling portion and the pair of linear portions and a composite frame that is made of fiber-reinforced plastic and that is provided so as to extend at least in the pair of linear portions are bonded together, and thereby, the pair of linear portions and the coupling portion are formed. The metal frame is provided so as to extend from the fulcrum shaft attachment portion to the cylinder attachment portion.

9 Claims, 16 Drawing Sheets

(56) References Cited

U.S. PATENT DOCUMENTS

| | | | |
|---|---|---|---|
| 5,110,072 A * | 5/1992 | Owl | 244/213 |
| 5,651,513 A * | 7/1997 | Arena | 244/99.3 |
| 5,836,550 A * | 11/1998 | Paez | 244/214 |
| 5,839,694 A * | 11/1998 | Bargull et al. | 244/118.1 |
| 6,675,546 B2 * | 1/2004 | Coles | 52/655.1 |
| 6,755,376 B1 * | 6/2004 | Broberg | 244/99.2 |
| 7,216,860 B2 | 5/2007 | Budde et al. | |
| 7,331,548 B1 * | 2/2008 | Simkulet | 244/225 |
| 7,429,165 B2 | 9/2008 | Burdgick et al. | |
| 2004/0045762 A1 | 3/2004 | Budde et al. | |
| 2007/0292274 A1 | 12/2007 | Burdgick et al. | |
| 2008/0283667 A1 | 11/2008 | Darrow | |

FOREIGN PATENT DOCUMENTS

| | | |
|---|---|---|
| JP | S62-15200 A | 1/1987 |
| JP | 62-165007 | 7/1987 |
| JP | H02-127194 A | 5/1990 |
| JP | 05-097095 | 4/1993 |
| JP | H07-52861 A | 2/1995 |
| JP | H09-119459 A | 5/1997 |
| JP | 2004-323012 A | 11/2004 |
| JP | 2005-507816 A | 3/2005 |
| JP | 2007-332968 A | 12/2007 |
| JP | 2010-512268 A | 4/2010 |
| WO | 03/039893 A1 | 5/2003 |
| WO | 2008/118229 A2 | 10/2008 |

* cited by examiner

US 8,678,694 B2

AIRCRAFT REACTION LINK

CROSS-REFERENCE TO RELATED APPLICATIONS

This application claims priority to Japanese Patent Application No. 2009-281372. The entire disclosure of Japanese Patent Application No. 2009-281372 is hereby incorporated herein by reference.

BACKGROUND OF THE INVENTION

1. Field of the Invention

The present invention relates to an aircraft reaction link that is used as a constituent component of an actuator for driving a control surface of an aircraft, and that can be coupled pivotably to the control surface and a hydraulically driven cylinder attached to the control surface or to a horn arm member.

2. Description of Related Art

An aircraft is provided with control surfaces that are formed as moving surfaces (flight control surfaces) and are configured as an aileron, a rudder, an elevator, and the like. As a constituent component of an actuator for driving such control surfaces, aircraft reaction links as disclosed in JP 05-97095A and JP 62-165007A are known that are coupled pivotably to a control surface and a hydraulically driven cylinder attached to the control surface or a to horn arm member attached to the control surface.

The aircraft reaction links disclosed in JP 05-97095A and JP 62-165007A are made of light metal such as titanium alloy or aluminum alloy, from the viewpoint of achieving weight reduction while securing a specific strength. Also, the reaction links that are coupled pivotably to the cylinder and the control surface are formed in the shape of a portal including a pair of linear portions and a coupling portion, in order to stably drive the control surface via actuation of the cylinder. The pair of linear portions are disposed alongside each other and each extend linearly, and the coupling portion is provided so as to connect to one end of each of the pair of linear portions on the same side via a bent portion, and also to couple those ends to each other. Also, the other end of each of the pair of linear portions is coupled pivotably to the other end of the cylinder, and the center portion of the coupling portion is coupled pivotably to the control surface.

However, even for a metal aircraft reaction link made of titanium alloy or the like in order to achieve weight reduction while securing a specific strength, there is a limit to weight reduction, and it is difficult to achieve a further weight reduction in the current situation. For this reason, in order to achieve weight reduction, it is necessary to create the structure of an aircraft reaction link from a drastic point of view that is completely different from that of conventional technology. Also, in addition to achieving weight reduction, it is necessary to secure strength and rigidity that are equivalent to or greater than those achieved by the conventional technology. Furthermore, in this case, it is important to secure a sufficient rigidity against a multi-directional load exerted on the aircraft reaction link formed in the shape of a portal.

SUMMARY OF THE INVENTION

In view of the above-described situations, it is an object of the present invention to provide an aircraft reaction link that can secure strength and rigidity that are equivalent to or greater than those achieved by the conventional technology while achieving weight reduction, and can also secure a sufficient rigidity against a multi-directional load.

In order to achieve the above-described object, an air craft reaction link according to a first feature of the present invention is a reaction link that is used as a constituent component of an actuator for driving a control surface of an aircraft, and that can be coupled to a hydraulically driven cylinder whose one end is attached pivotably to the control surface or to a horn arm member attached to the control surface, the aircraft reaction link including: a pair of linear portions disposed alongside each other and each extending linearly; a coupling portion connecting to one end of each of the pair of linear portions on the same side via a bent portion and extending so as to couple the one end of each of the pair of linear portions on the same side to each other; a fulcrum shaft attachment portion that is provided so as to protrude from a center portion of the coupling portion and that can be attached pivotably to a fulcrum shaft for rotatably supporting the control surface; and a cylinder attachment portion that is provided as the other end of each of the pair of linear portions and that can be attached pivotably to the other end of the cylinder via a pivot shaft, wherein a metal frame that is made of a metallic material and that is provided so as to extend across the coupling portion and the pair of linear portions and a composite frame that is made of fiber-reinforced plastic and that is provided so as to extend at least in the pair of linear portions are bonded together, whereby the pair of linear portions and the coupling portion are formed, and the metal frame is provided so as to extend from the fulcrum shaft attachment portion to the cylinder attachment portion.

With this configuration, the aircraft reaction link is formed by bonding together the metal frame constituting the pair of linear portions and the coupling portion and the composite frame constituting at least the pair of linear portions.

The composite frame is made of fiber-reinforced plastic, which has a significantly smaller specific gravity (i.e., also has a significantly smaller density) and has a significantly greater specific strength than light metal such as titanium alloy. Accordingly, it is possible to achieve weight reduction as compared to conventional aircraft reaction links made of metal such as titanium alloy, and to secure strength and rigidity that are equal to or greater than those achieved with conventional reaction links. Furthermore, with this configuration, the metal frame is provided so as to extend from the fulcrum shaft attachment portion via the coupling portion and the pair of linear portions to the cylinder attachment portion, and therefore a sufficient rigidity against a multi-directional load exerted on the aircraft reaction link formed in the shape of a portal can also be secured.

Accordingly, with this configuration, it is possible to provide an aircraft reaction link that can secure strength and rigidity that are equal to or greater than those achieved with conventional configurations, while achieving weight reduction, and also can secure a sufficient rigidity against a multi-directional load.

According to a second feature of the present invention, in the aircraft reaction link having the first feature, the metal frame and the composite frame are disposed overlapping in a width direction that is the direction in which the pair of linear portions are disposed alongside each other, and the composite frame is bonded to the metal frame provided in the pair of linear portions on inner lateral faces or outer lateral faces of the metal frame in the width direction.

With this configuration, the composite frame is bonded to the metal frame on inner lateral faces or outer lateral faces of the metal frame in the width direction, and thereby, the metal frame and the composite frame are integrated into one unit in a state in which they overlap each other in the width direction. Accordingly, it is possible to efficiently disperse and support the load in the longitudinal direction in the metal frame and the composite frame that extend along the pair of linear portions, while also suppressing the occurrence of an unbalanced load in the width direction. This makes it possible to efficiently secure a greater rigidity as the aircraft reaction link as a whole.

According to a third feature of the present invention, in the aircraft reaction link having the second feature, a first through hole that is shaped so as to pass through and communicate with the metal frame and the composite frame is formed in the cylinder attachment portion that is provided as the other end of each of the pair of linear portions, and a bearing for rotatably holding the pivot shaft or a cylindrical slidable member coming into slidable contact with an outer perimeter of the pivot shaft is fixed to the first through hole from the metal frame to the composite frame.

With this configuration, the composite frame is provided from the pair of linear portions to the cylinder attachment portion, and therefore it is possible to achieve a further weight reduction. Also, the first through hole passing through both the metal frame and the composite frame is provided in the cylinder attachment portion, and the bearing or the slidable member for rotatably holding the pivot shaft is fixed to both the metal frame and the composite frame in the first through hole. Accordingly, it is possible to realize a structure in which the aircraft reaction link for which weight reduction has been achieved even for the cylinder attachment portion can be supported relative to the pivot shaft more stably.

According to a fourth feature of the present invention, in the aircraft reaction link having the second feature, the composite frame is provided so as to extend from the pair of linear portions via the coupling portion to the fulcrum shaft attachment portion, a second through hole that is shaped so as to pass through and communicate with the metal frame and the composite frame is formed in the fulcrum shaft attachment portion, and a bearing for rotatably holding the fulcrum shaft or a cylindrical slidable member coming into slidable contact with an outer perimeter of the fulcrum shaft is fixed to the second through hole from the metal frame to the composite frame.

With this configuration, the composite frame is provided from the pair of linear portions to the fulcrum shaft attachment portion, and therefore it is possible to achieve a further weight reduction. Also, the second through hole passing through both the metal frame and the composite frame is formed in the fulcrum shaft attachment portion, and the bearing or the slidable member for rotatably supporting the fulcrum shaft is fixed to both the metal frame and the composite frame in the second through hole. Accordingly, it is possible to realize a structure in which the aircraft reaction link for which weight reduction has been achieved even for the fulcrum shaft attachment portion can be supported relative to the fulcrum shaft more stably.

According to a fifth feature of the present invention, in the aircraft reaction link having the first feature, the metal frame includes a metal pipe portion that is provided in the pair of linear portions and that is formed in the shape of a pipe having a hollow cross section, the composite frame includes a composite pipe portion that is provided in the pair of linear portions and that is formed in the shape of a pipe having a hollow cross section, and the metal pipe portion and the composite pipe portion are bonded together as a double tube in which one of the metal pipe portion and the composite pipe portion is disposed inside the other and an inner wall of the one of the metal pipe portion and the composite pipe portion is in close contact with an outer wall of the other.

With this configuration, the metal frame and the composite frame include their respective pipe portions each having a hollow cross section, and these pipe portions are bonded together in close contact as a double tube, and integrated into one unit. Accordingly, it is possible to efficiently disperse and support the load in the longitudinal direction in the metal frame and the composite frame that extend along the pair of linear portions, while also suppressing the occurrence of an unbalanced load in a cross section perpendicular to the longitudinal direction. Since the metal frame and the composite frame are formed in the shape of a pipe in the pair of linear portions, it is possible to easily set the geometrical moment of inertia large, while realizing a configuration with a reduced weight. This makes it possible to efficiently secure a greater rigidity as the aircraft reaction link as a whole.

According to a sixth feature of the present invention, in the aircraft reaction link having the first feature, the metal frame and the composite frame are disposed overlapping in at least a center portion in the longitudinal direction of the pair of linear portions in a thickness direction that is a direction perpendicular to a width direction that is a direction in which the pair of linear portions are disposed alongside each other and the longitudinal direction of the pair of linear portions.

With this configuration, the metal frame and the composite frame are bonded together and integrated into one unit in a state in which they overlap each other in the thickness direction at least in the center portion in the longitudinal direction of the pair of linear portions. Accordingly, it is possible to efficiently disperse and support the load in the longitudinal direction in the metal frame and the composite frame that extend along the pair of linear portions, while also suppressing the occurrence of an unbalanced load in the width direction. This makes it possible to efficiently secure a greater rigidity as the aircraft reaction link as a whole.

According to a seventh feature of the present invention, in the aircraft reaction link having the sixth feature, a third through hole that is shaped so as to pass through and communicate with an end of each of the metal frame and the composite frame that are disposed overlapping each other in the width direction is formed in the cylinder attachment portion provided as the other end of each of the pair of linear portions, and a bearing for rotatably holding the pivot shaft or a cylindrical slidable member coming into slidable contact with an outer perimeter of the pivot shaft is fixed to the third through hole from the metal frame to the composite frame.

With this configuration, the composite frame is provided from the pair of linear portions to the cylinder attachment portion, and therefore it is possible to achieve a further weight reduction. Also, the third through hole passing through both the metal frame and the composite frame is provided in the cylinder attachment portion, and the bearing or the slidable member for rotatably holding the pivot shaft is fixed to both the metal frame and the composite frame in the third through hole. Accordingly, it is possible to realize a structure in which the aircraft reaction link for which weight reduction has been achieved even for the cylinder attachment portion can be supported relative to the pivot shaft more stably.

According to an eighth feature of the present invention, in the aircraft reaction link having the sixth feature, the composite frame is provided so as to extend from the pair of linear portions via the coupling portion to the fulcrum shaft attachment portion, a fourth through hole that is shaped so as to pass through and communicate with an end of each of the metal frame and the composite frame that are disposed overlapping in the width direction is formed in the fulcrum shaft attachment portion, and a bearing for rotatably holding the fulcrum shaft or a cylindrical slidable member coming into slidable contact with an outer perimeter of the fulcrum shaft is fixed to the fourth through hole from the metal frame to the composite frame.

With this configuration, the composite frame is provided from the pair of linear portions to the fulcrum shaft attachment portion, and therefore it is possible to achieve a further weight reduction. Also, the fourth through hole passing through both the metal frame and the composite frame is formed in the fulcrum shaft attachment portion, and the bearing or the slidable member for rotatably supporting the fulcrum shaft is fixed to both the metal frame and the composite frame in the fourth through hole. Accordingly, it is possible to realize a structure in which the aircraft reaction link for which weight reduction has been achieved even for the fulcrum shaft attachment portion can be supported relative to the fulcrum shaft more stably.

According to a ninth feature of the present invention, in the aircraft reaction link having the first feature, the metal frame is made of an iron-based material.

In the case where an iron-based material is used as the raw material constituting a metal frame, the specific gravity of the metal frame is increased as compared to the case where titanium alloy is used. However, with this configuration, an aircraft reaction link is configured in which an iron-based material, which has a higher modulus of longitudinal elasticity than titanium alloy, is used to make a metal frame and the metal frame is bonded to a composite frame made of fiber-reinforced plastic. Accordingly, with this aircraft reaction link, it is possible to achieve a further weight reduction when desired strength and rigidity are secured, as compared to the case where a metal frame made of titanium alloy is used.

It should be appreciated that the above and other objects, and features and advantages of the present invention will become apparent from the following description taken in conjunction with the accompanying drawings.

DETAILED DESCRIPTION OF THE INVENTION

Hereinafter, embodiments for carrying out the present invention will be described with reference to the accompanying drawings. The embodiments of the present invention can be widely applied as an aircraft reaction link that is used as a constituent component of an actuator for driving a control surface of an aircraft, and that can be coupled pivotably to the control surface and a hydraulically driven cylinder attached to the control surface or to a horn arm member.

Embodiment 1

Figure 1:
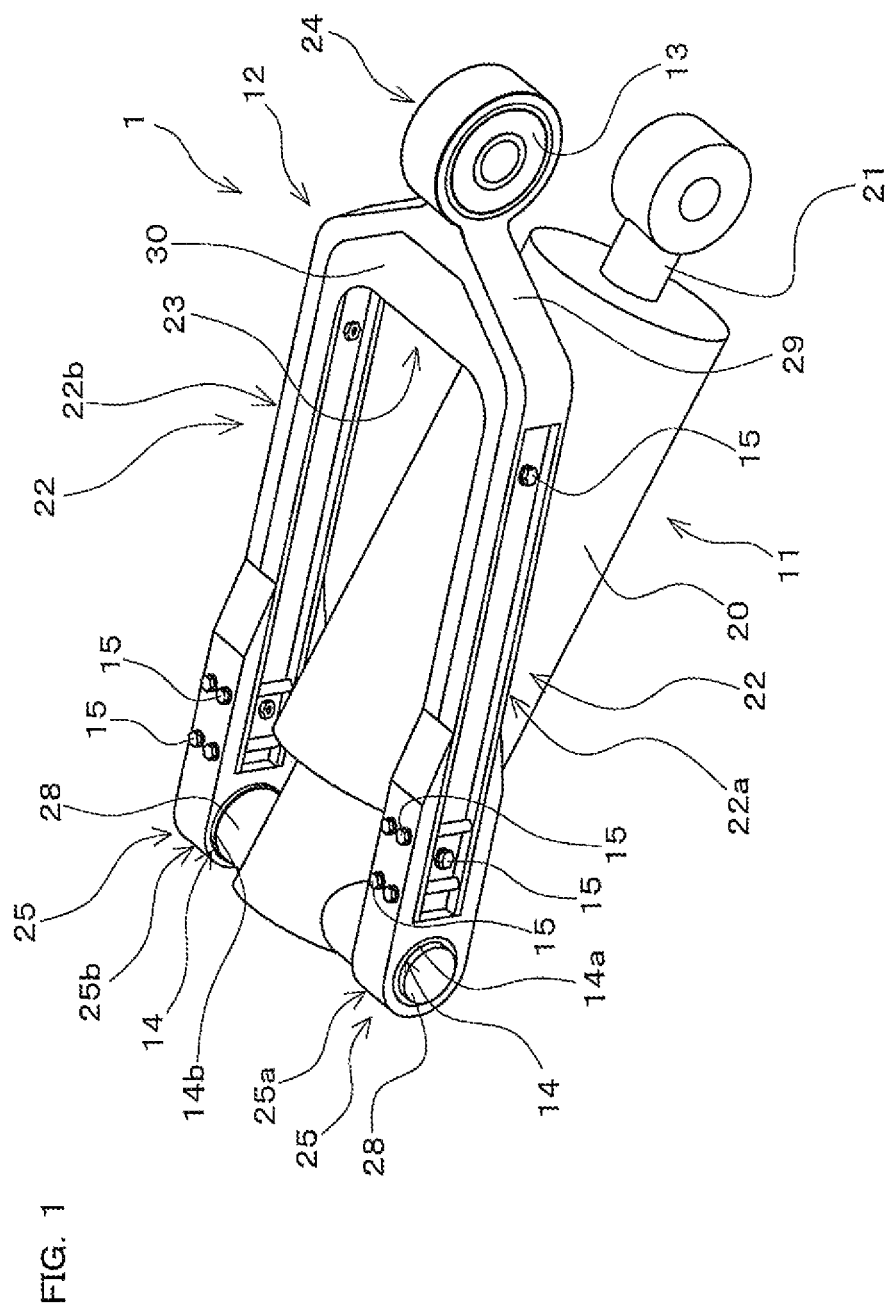
FIG. 1 is a perspective view showing an aircraft reaction link according to Embodiment 1 of the present invention, together with a cylinder.
Figure 2:
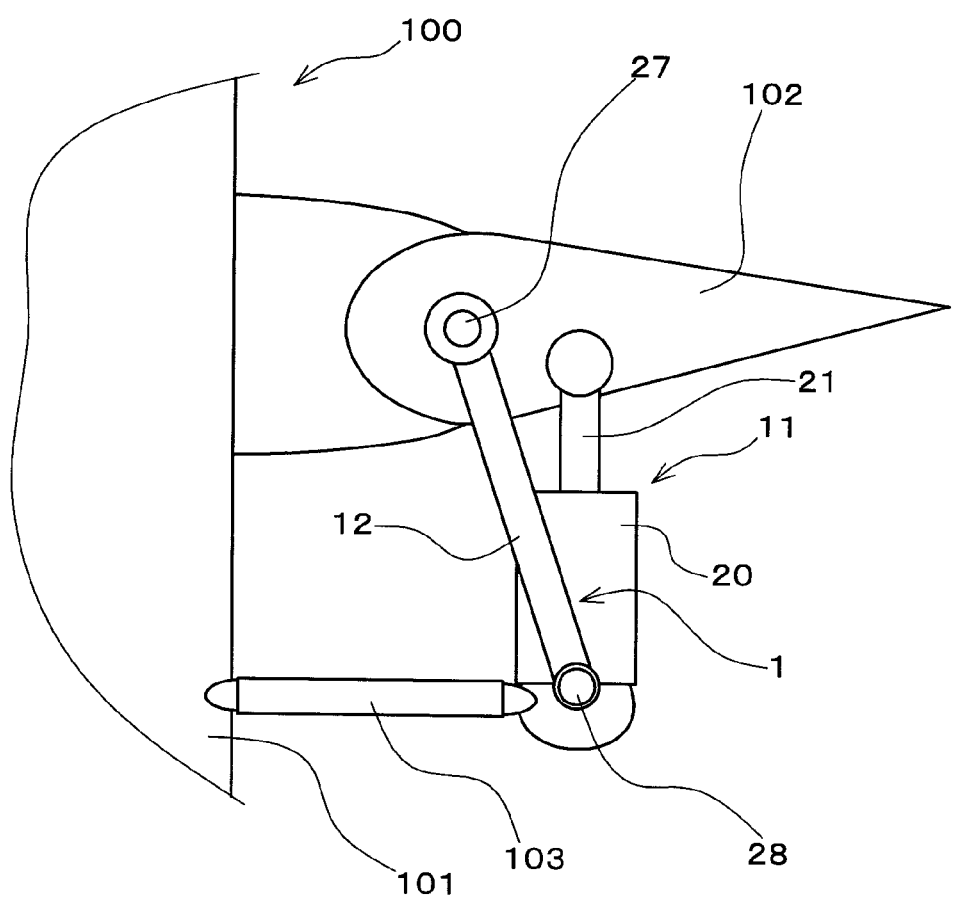
FIG. 2 is a schematic diagram illustrating a state in which the aircraft reaction link shown in FIG. 1 is attached to the body of an aircraft, together with a part of the body.

FIG. 1 is a perspective view showing an aircraft reaction link 1 (hereinafter, may also be simply referred to as a "reaction link 1") according to Embodiment 1 of the present invention, together with a hydraulically driven cylinder 11. FIG. 2 is a schematic diagram illustrating a state in which the reaction link 1 is attached to a body 100 of an aircraft, together with a part of the body 100. As shown in FIG. 2, the reaction link 1 that is used as a constituent component of an actuator for driving a control surface 102 of the aircraft is attached to a body frame 101 of the body 100, and is provided so as to prevent a load applied to the control surface 102 from directly affecting the body frame 101. Examples of aircraft moving surfaces (flight control surfaces) constituting the control surface 102 include an aileron, a rudder, and an elevator. The reaction link 1 shown in FIGS. 1 and 2 may also be used as a constituent component of an actuator for driving a control surface formed as a flap, a spoiler, or the like.

As shown in FIGS. 1 and 2, the reaction link 1 is coupled to the hydraulically driven cylinder 11. The cylinder 11 includes a cylinder body 20 and a rod portion 21. The cylinder 11 is actuated by supplying and discharging pressure oil to and from the inside of the cylinder body 20 using a hydraulic system (not shown) provided in an aircraft (not shown), and the cylinder 11 is actuated such that it is displaced so as to extend or contract from or into the cylinder body 20. Further, at the tip end of the rod portion 21, which is located at one end of the cylinder 11, the cylinder 11 is attached pivotably to the control surface 102 via a hinge portion or the like. At an end of the cylinder body 20, which is located at the other end of the cylinder 11, the cylinder 11 is supported relative to the body frame 101 via a supporting member 103. Further, the cylinder 11 is coupled pivotably to the supporting member 103 (in FIG. 1, the illustration of a state of coupling between the cylinder 11 and the supporting member 103 has been omitted). Note that the tip end of the rod portion 21 need not be directly attached to the control surface, and may be attached pivotably to the horn arm member attached to the control surface.

As shown in FIGS. 1 and 2, the reaction link 1 includes a reaction link body 12, a bearing 13, bushes 14, fastening members 15, and so forth.

Figure 3:
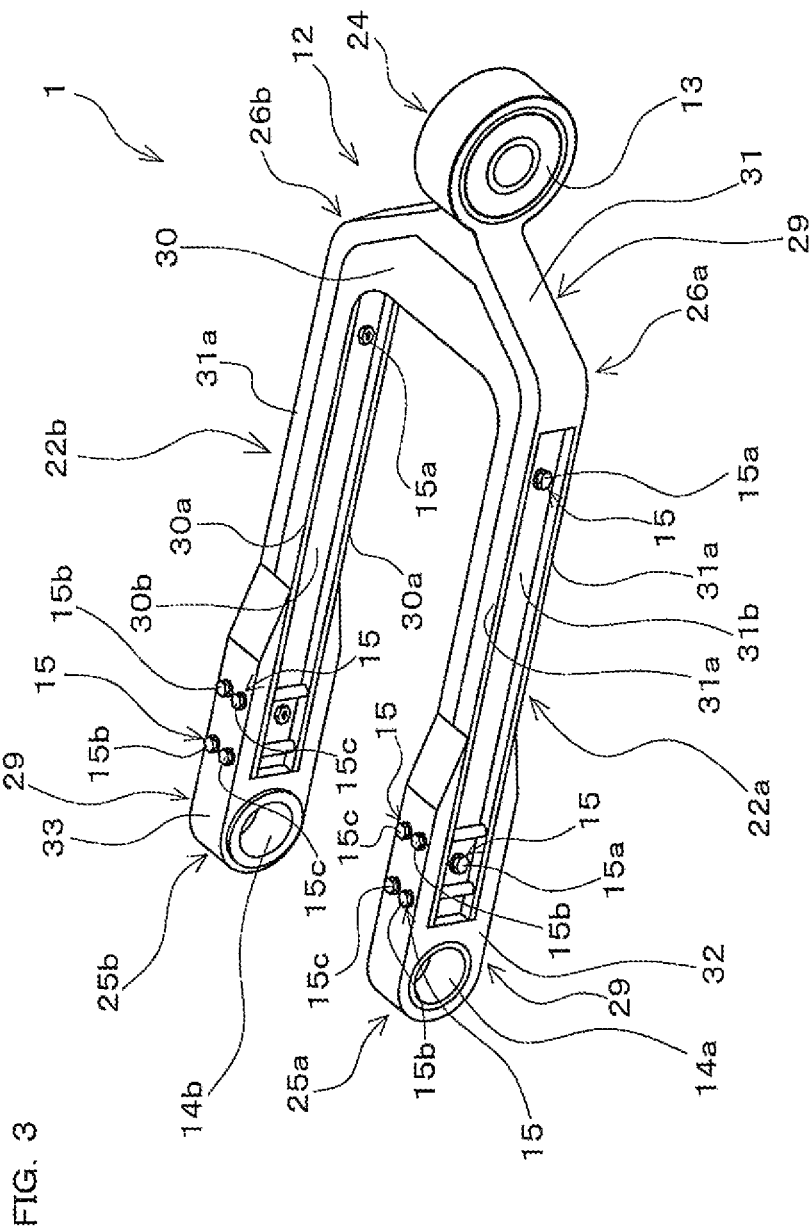
FIG. 3 is a perspective view of the aircraft reaction link shown in FIG. 1.
Figure 4:
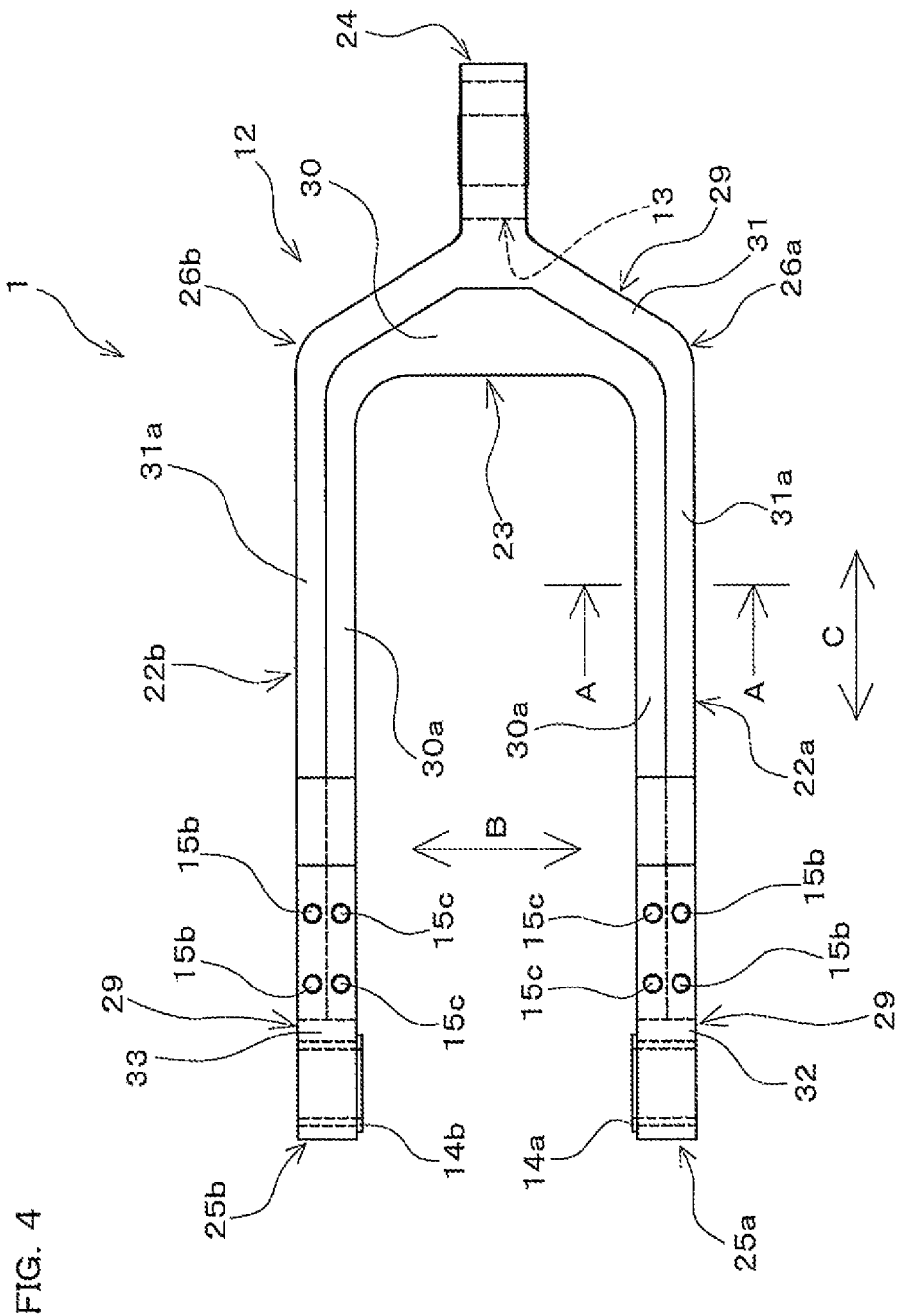
FIG. 4 is a plan view of the aircraft reaction link shown in FIG. 3.

FIG. 3 is a perspective view of the reaction link 1. FIG. 4 is a plan view of the reaction link 1. The reaction link body 12 of the reaction link 1 shown in FIGS. 1 to 4 is provided as a link element formed in the shape of a portal, and includes a pair of linear portions 22 (22a, 22b), a coupling portion 23, a fulcrum shaft attachment portion 24, and cylinder attachment portions 25. Note that the reaction link body 12 includes, as will be described later, a metal frame 29 and a composite frame 30, and the metal frame 29 and the composite frame 30 are bonded together into one unit, thus forming the pair of linear portions 22 and the coupling portion 23 described above.

The pair of linear portions 22 of the reaction link body 12 are made up of a linear portion 22a and a linear portion 22b disposed substantially parallel to each other and each extending linearly. The coupling portion 23 is formed as a portion extending so as to connect to one end of each of the pair of linear portions 22 on the same side via bent portions (26a, 26b) and to couple those ends to each other. Note that the coupling portion 23 is formed so as to extend in a direction substantially orthogonal to the linear portion 22a and the linear portion 22b, and the bent portions (26a, 26b) are formed as portions that are bent at substantially a right angle. Also, the coupling portion 23 is formed so as to connect to one end of the linear portion 22a via the bent portion 26a, to connect to one end of the linear portion 22b via the bent portion 26b, and to couple those ends of the pair of linear portions 22a and 22b to each other.

The fulcrum shaft attachment portion 24 of the reaction link body 12 is provided so as to protrude from the center portion of the coupling portion 23 (the center portion in the direction in which the pair of linear portions 22 are coupled) toward the control surface 102. Also, the fulcrum shaft attachment portion 24 is provided as a portion that can be attached pivotably via the bearing 13 to a fulcrum shaft 27 (see FIG. 2) for rotatably supporting the control surface 102 with respect to the body frame 101. Further, the fulcrum shaft attachment portion 24 is formed as a cylindrical portion integrated with the coupling portion 23 and having a shorter axial length, and the outer ring of the bearing 13 described above is fixed by fitting to the inner wall of the fulcrum shaft attachment portion 24. By the fulcrum shaft attachment portion 24 and the bearing 13 being provided in this way, the reaction link body 12 is coupled pivotably to the control surface 102 at the fulcrum shaft attachment portion 24.

The cylinder attachment portions 25 of the reaction link body 12 are provided as the other end of each of the pair of linear portions 22 that is opposite from the coupling portion 23. Also, the cylinder attachment portions 25 are made up of a cylinder attachment portion 25a provided as the other end of the linear portion 22a and a cylinder attachment portion 25b provided as the other end of the linear portion 22b.

Further, a through hole is formed in each of the cylinder attachment portions (25a, 25b), and the bushes 14 are attached by fitting to the through holes. The bushes 14 are made up of a bush 14a for being fixed to the cylinder attachment portion 25a and a bush 14b for being fixed to the cylinder attachment portion 25b. The bushes 14a and 14b are each formed in a cylindrical shape having a through hole through which a pivot shaft 28, which will be described later, penetrates. Also, the bushes (14a, 14b) are each configured as a slidable member whose inner perimeter comes into slidable contact with the outer perimeter of the pivot shaft 28. Consequently, the cylinder attachment portions (25a, 25b) are attached pivotably to the pivot shafts 28.

As shown in FIG. 1, the pivot shafts 28 described above are provided as a pair of cylindrical portions that are formed integrally with the cylinder body 20 at the other end of the cylinder body 20 of the cylinder 11 (the side opposite from the side where the rod portion 21 protrudes). Also, the pivot shafts 28 are formed so as to protrude in the opposite directions from each other along the same straight line on both lateral sides of the other end of the cylinder body 20. The pivot shafts 28 come into slidable contact with the bushes 14 and are held in a rotatable state. Consequently, the cylinder attachment portions (25a, 25b) of the reaction link body 12 are attached pivotably to the other end of the cylinder 11 via the bushes 14 and the pivot shafts 28. In this way, the reaction link body 12 is coupled pivotably to the cylinder 11 and the control surface 102.

Although a case where the pivot shafts 28 are formed integrally with the cylinder body 20 is described above as an example, this need not be the case. For example, pivot shafts 28 that are each formed as a separate part may be fixed to the cylinder body 20, or the other end of the cylinder body 20 may be attached rotatably to pivot shafts 28 that are each provided as a separate part. Although this embodiment has been described taking, as an example, the bushes 14 as elements for rotatably holding the pivot shafts 28 relative to the cylinder attachment portions 25, this need not be the case. For example, bearings may be provided as elements for rotatably holding the pivot shafts 28 relative to the cylinder attachment portions 25.

Figure 5:
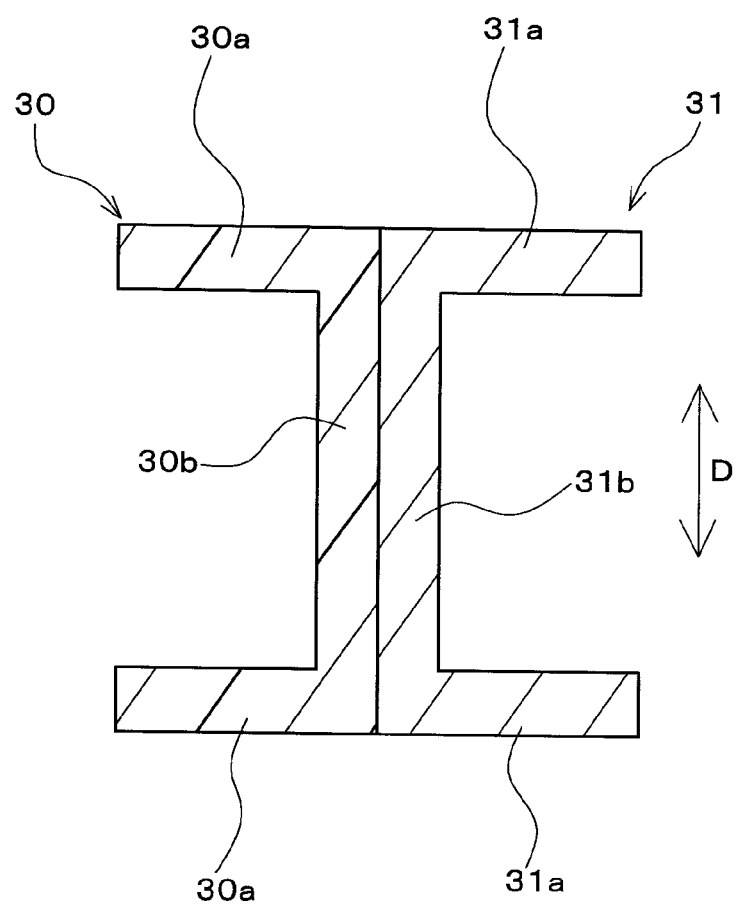
FIG. 5 is a cross-sectional view looking in the direction of arrows A-A in FIG. 4.

FIG. 5 is a cross-sectional view looking in the direction of arrows A-A in FIG. 4. As shown in FIGS. 3 to 5, the reaction link body 12 is configured by bonding the metal frame 29 and the composite frame 30 together, thus forming the pair of linear portions 22 and the coupling portion 23. The metal frame 29 is made of a metallic material (e.g., titanium alloy), is provided so as to extend across the coupling portion 23 and the pair of linear portions 22, and includes a body member 31 and end members (32, 33).

The body member 31 is provided as a member constituting, together with a composite frame 30, which will be described later, the basic skeleton of the pair of linear portions 22 and the coupling portion 23, extending across the pair of linear portions 22 and the coupling portion 23, and also constituting the fulcrum shaft attachment portion 24. A pair of plate-like portions (31a, 31a) and a bridging portion 31b are provided in portions of the body member 31 that are provided in the pair of linear portions 22. The pair of plate-like portions (31a, 31a) are each formed as a plate-like portion and are provided as a pair of portions that are arranged parallel to each other. The bridging portion 31b is provided as a portion that is connected, substantially perpendicularly, to one edge of each of the pair of plate-like portions (31a, 31a) and that bridges the pair of plate-like portions (31a, 31a) by coupling them.

The pair of plate-like portions (31a, 31a) and the bridging portion 31b that are disposed so as to extend in each of the linear portions (22a, 22b) are disposed alongside each other in the thickness direction of the reaction link 1 (the direction indicated by double-ended arrow D in FIG. 5). Also, the cross section of the body member 31 that is perpendicular to the pair of plate-like portions (31a, 31a) and the bridging portion 31b is formed in a cross-sectional shape such as that of a square pipe one side of which is absent and thus is open toward the outside in the width direction of the reaction link 1. Forming such a cross sectional shape enables a configuration that is light-weight and that can secure a large geometrical moment of inertia. Note that the thickness direction of the reaction link 1 is defined as a direction that is perpendicular to both the width direction of the reaction link 1 (the direction indicated by double-ended arrow B in FIG. 4) and the longitudinal direction of the pair of linear portions 22 (22a, 22b) (the direction indicated by double-ended arrow C in FIG. 4). The width direction of the reaction link 1 is defined as a direction in which the pair of linear portions 22 (22a, 22b) is disposed alongside each other.

The portion of the body member 31 that constitutes the coupling portion 23 and the fulcrum shaft attachment portion 24 is formed integrally with the pair of plate-like portions (31a, 31a) and the bridging portion 31b described above. Also, the fulcrum shaft attachment portion 24 is disposed such that its axial direction (the direction of the cylinder axis) is parallel to the width direction of the reaction link 1.

The end members (32, 33) are each formed as a member constituting a part of the surface portion of the other end of each of the cylinder attachment portions 25 and the linear portions (22a, 22b). The end member 32 is provided with the cylinder attachment portion 25a and a pair of protruding portions formed in the shape of plates extending parallel to each other and protruding from the cylinder attachment portion 25a in the longitudinal direction of the linear portion 22a. Likewise, the end member 33 is provided with the cylinder attachment portion 25b and a pair of protruding portions formed in the shape of plates extending parallel to each other and protruding from the cylinder attachment portion 25b in the longitudinal direction of the linear portion 22b. Also, the pairs of protruding portions of each of the end members (32, 33) constitute the surface portion on both sides in the thickness direction at the other end of each of the linear portions (22a, 22b).

As described above, the metal frame 29 includes the body member 31 and the end members (32, 33), and the body member 31 and the end members (32, 33) are bonded together by fastening members 15b, which will be described later, such that they are integrated into one unit. Consequently, the metal frame 29 is provided so as to extend from the fulcrum shaft attachment portion 24 via the coupling portion 23 and the pair of linear portions 22 to the cylinder attachment portions 25.

The composite frame 30 shown in FIGS. 3 to 5 is provided so as to extend across the pair of linear portions 22 and the coupling portion 23. Also, the composite frame 30 is disposed inside the body member 31 of the metal frame 29 in the pair of linear portions 22 and the coupling portion 23. Consequently, the metal frame 29 and the composite frame 30 are disposed overlapping in the width direction of the reaction link 1. Also, the composite frame 30 is bonded by fastening members 15a, which will be described later, to the metal frame 29 provided in the pair of linear portions 22 on lateral surfaces on the insides in the width direction.

Further, the composite frame 30 is made of carbon fiber-reinforced plastic (CFRP). Note that the composite frame 30 may be made of fiber-reinforced plastic other than carbon fiber-reinforced plastic. For example, the composite frame 30 may be made of fiber-reinforced plastic such as glass fiber-reinforced plastic, glass mat reinforced plastics, boron fiber-reinforced plastic, aramid fiber-reinforced plastic, polyethylene fiber-reinforced plastic, and Zylon fiber-reinforced plastic.

A pair of plate-like portions (30a, 30a) and a bridging portion 30b are provided in portions of the composite frame 30 that are provided in the pair of linear portions 22. The pair of plate-like portions (30a, 30a) are each formed as a plate-like portion and are provided as a pair of portions that are arranged parallel to each other. The bridging portion 30b is provided as a portion that is connected, substantially perpendicularly, to one edge of each of the pair of plate-like portions (30a, 30a) and that bridges the pair of plate-like portions (30a, 30a) by coupling them.

The pair of plate-like portions (30a, 30a) and the bridging portion 30b that are disposed so as to extend in each of the linear portions (22a, 22b) are disposed alongside each other in the thickness direction of the reaction link 1. Also, the cross section of the composite frame 30 that is perpendicular to the pair of plate-like portions (30a, 30a) and the bridging portion 30b is formed in a cross-sectional shape such as that of a square pipe one side of which is absent and thus is open toward the inside in the width direction of the reaction link 1. Forming such a cross sectional shape enables a configuration that is light-weight and that can secure a large geometrical moment of inertia.

The fastening members 15 are each provided as a member that bonds the metal frame 29 and the composite frame 30 together into one unit as the reaction link body 12. Also, as shown in FIGS. 3 and 4, fastening members 15a that bond the body member 31 and the composite frame 30 together, fastening members 15b that bond the body member 31 and the end members (32, 33) together, and fastening members 15c that bond the composite frame 30 and the end members (32, 33) together are provided as the fastening members 15.

The fastening members 15a are each configured as a unit including a bolt and a nut that is screwed to the bolt, and a plurality of such units (in this embodiment, four units) are provided. Also, in each of the fastening members 15a, the bolt penetrates through the bridging portion 31b of the body member 31 of the metal frame 29 and the bridging portion 30b of the composite frame 30 in the width direction of the reaction link 1, and the nut is screwed to that bolt. Consequently, the body member 31 and the composite frame 30 are bonded together in a state in which the bridging portion 31b and the bridging portion 30b are in close contact. Note that each of the fastening members 15a is disposed at both longitudinal ends of the linear portions (22a, 22b).

The fastening members 15b are each configured as a unit including a bolt, a nut that is screwed to the bolt, and a straight bush. A plurality of such units (in this embodiment, four units) are provided, and the same number of the units (two units for each) are disposed for the linear portion 22a and the linear portion 22b. Also, in each of the fastening members 15b, the bolt penetrates through the pair of protruding portions of the end members (32, 33) of the metal frame 29 and the pair of plate-like portions (31a, 31a) of the body member 31 of the metal frame 29 in the thickness direction of the reaction link 1, and the nut is screwed to that bolt. Consequently, the body member 31 and the end member 32 are bonded together, and likewise, the body member 31 and the end member 33 are bonded together.

The fastening members 15c are each configured as a unit including a bolt, a nut that is screwed to the bolt, and a straight bush. A plurality of such units (in this embodiment, four units) are provided, and the same number of the units (two units for each) are disposed for the linear portion 22a and the linear portion 22b. Also, in each of the fastening members 15c, the bolt penetrates through the pair of protruding portions of the end members (32, 33) of the metal frame 29 and the pair of plate-like portions (30a, 30a) of the composite frame 30 in the thickness direction of the reaction link 1, and the nut is screwed to the bolt. Consequently, the composite frame 30 and the end member 32 are bonded together, and likewise, the composite frame 30 and the end member 33 are bonded together.

Note that the straight bush in each of the fastening members 15b and the fastening members 15c is formed as a cylindrical member. Also, the bolt of each of the fastening members (15b, 15c) is disposed so as to penetrate through the straight bush. Further, the straight bush of each of the fastening members 15b is disposed between the pair of plate-like portions (31a, 31a), with both of their ends in the direction of the cylinder axis in contact with the corresponding plate-like portion 31a of the pair of plate-like portions (31a, 31a).

Likewise, the straight bush in each of the fastening members 15c is disposed between the pair of plate-like portions (30a, 30a), with both of their ends in the direction of the cylinder axis in contact with the corresponding plate-like portion 30a of the pair of plate-like portions (30a, 30a). By the straight bush being provided in this way, the pair of plate-like portions (31a, 31a) and the pair of plate-like portions (30a, 30a) are prevented from deformation that could be caused by fastening power exerted when the bolt and the nut are screwed together in each of the fastening members (15b, 15c).

Next, an operation of the reaction link 1 described above will be described along with an operation of the cylinder 11 that is coupled to the reaction link 1. When the control surface 102 is driven, a hydraulic system is actuated in accordance with an instruction from a controller (not shown), and pressure oil is supplied and discharged to and from the cylinder body 20 of the cylinder 11. As a result of supplying/discharging pressure oil, the rod portion 21 is displaced such that it extends or contracts from or into the cylinder body 20. Consequently, the control surface 102 is driven at one end of the rod portion 21 of the cylinder 11 that is pivotable about the pivot shafts 28. At that time, one end of the reaction link body 12 is attached pivotably to the fulcrum shaft 27 of the control surface 102 and the other end thereof is attached pivotably to the pivot shafts 28 as described above, and therefore the control surface 102 is driven so as to pivot about the fulcrum shaft 27.

Note that the reaction link 1 is configured by bonding the metal frame 29 and the composite frame 30 together, as described above. Therefore, provision of the metal frame 29 allows the reaction link 1 to achieve a greater improvement in fire resistance of an aircraft, for example, at the time of occurrence of a lightning strike during flight, as compared to an aircraft reaction link composed only of fiber-reinforced plastic.

As described above, with the aircraft reaction link 1, the pair of linear portions 22 and the coupling portion 23 of the reaction link body 12 are formed by bonding the metal frame 29 and the composite frame 30 together. The composite frame 30 is made of fiber-reinforced plastic, which has a significantly smaller specific gravity (i.e., also has a significantly smaller density) and has a significantly greater specific strength than light metal such as titanium alloy. Accordingly, it is possible to achieve weight reduction as compared to conventional aircraft reaction links made of metal such as titanium alloy, and to secure strength and rigidity that are equal to or greater than those achieved with conventional reaction links. Furthermore, with the aircraft reaction link 1, the metal frame 29 is provided so as to extend from the fulcrum shaft attachment portion 24 via the coupling portion 23 and the pair of linear portions 22 to the cylinder attachment portions 25, and therefore a sufficient rigidity against a multi-directional load exerted on the aircraft reaction link 1 formed in the shape of a portal can also be secured.

Accordingly, with this embodiment, it is possible to provide an aircraft reaction link 1 that can secure strength and rigidity that are equal to or greater than those achieved with conventional aircraft reaction links, while achieving weight reduction, and also to secure a sufficient rigidity against a multi-directional load.

Furthermore, with the aircraft reaction link 1, the composite frame 30 is bonded to the metal frame 29 on inner lateral faces of the metal frame 29 in the width direction, and thereby, the metal frame 29 and the composite frame 30 are integrated into one unit in a state in which they overlap each other in the width direction. Accordingly, it is possible to efficiently disperse and support the load in the longitudinal direction in the metal frame 29 and the composite frame 30 that extend along the pair of linear portions 22, while also suppressing the occurrence of an unbalanced load in the width direction. This makes it possible to efficiently secure a greater rigidity as the aircraft reaction link 1 as a whole.

Embodiment 2

Figure 6:
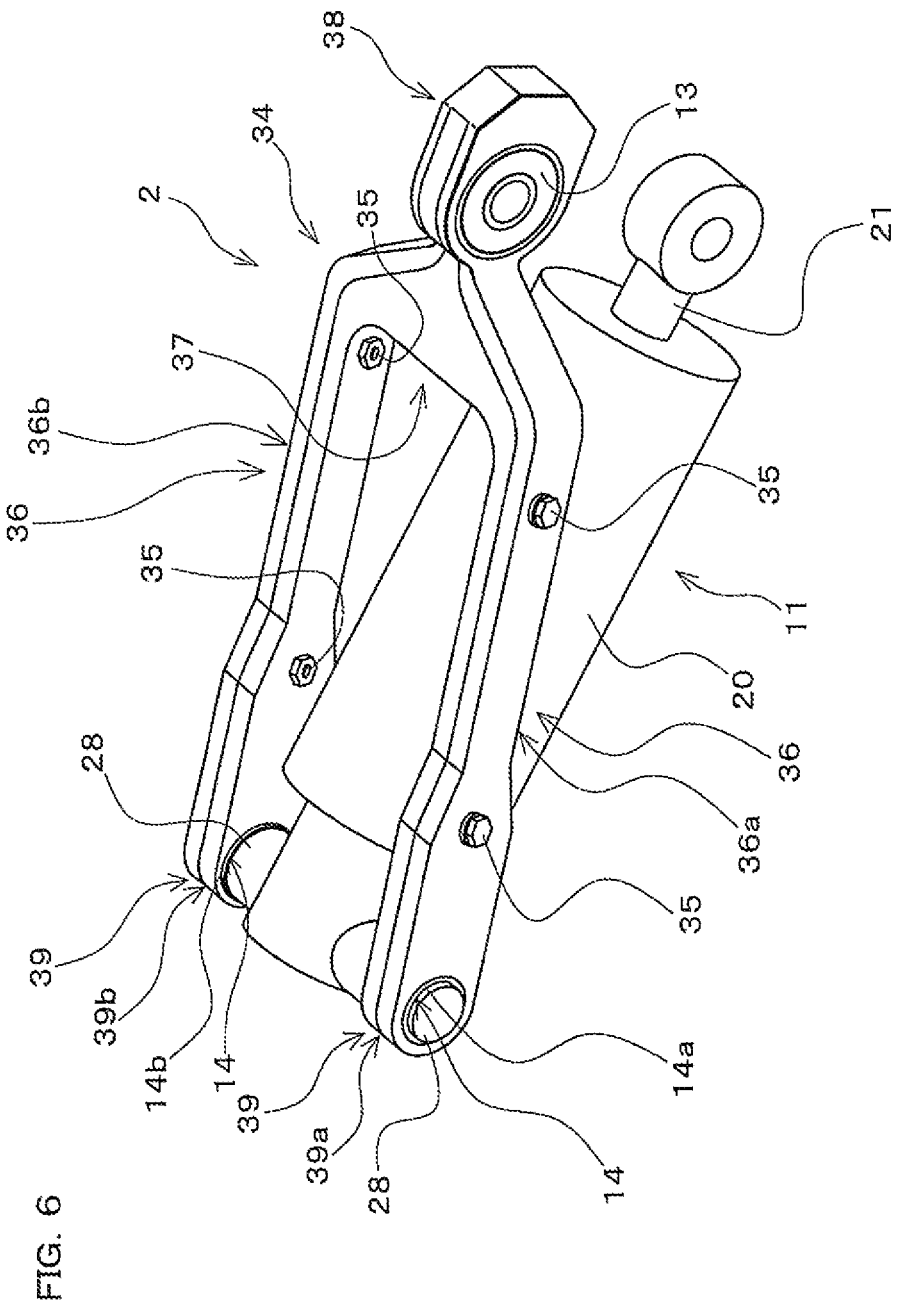
FIG. 6 is a perspective view showing an aircraft reaction link according to Embodiment 2 of the present invention, together with a cylinder.

Next, an aircraft reaction link 2 (hereinafter, may also be simply referred to as a "reaction link 2") according to Embodiment 2 of the present invention will be described. FIG. 6 is a perspective view showing the reaction link 2 together with a cylinder 11. As with the reaction link 1 of Embodiment 1, the reaction link 2 is used as a constituent component of an actuator for driving a control surface 102 of an aircraft, and is attached to a body frame 101 of a body 100 (see FIG. 2). As with Embodiment 1, the reaction link 2 is coupled pivotably to the control surface 102 and the cylinder 11, and includes a reaction link body 34, a bearing 13, bushes 14, fastening members 35 and so forth. However, the reaction link 2 is different from the reaction link 1 of Embodiment 1 in the configuration of the reaction link body 34. In the following description of the reaction link 2, the differences in configuration from Embodiment 1 will be described. The description of those elements configured in the same manner as in Embodiment 1 has been omitted by using the same reference numerals in the drawings, or by referring to the same reference numerals.

Figure 7:
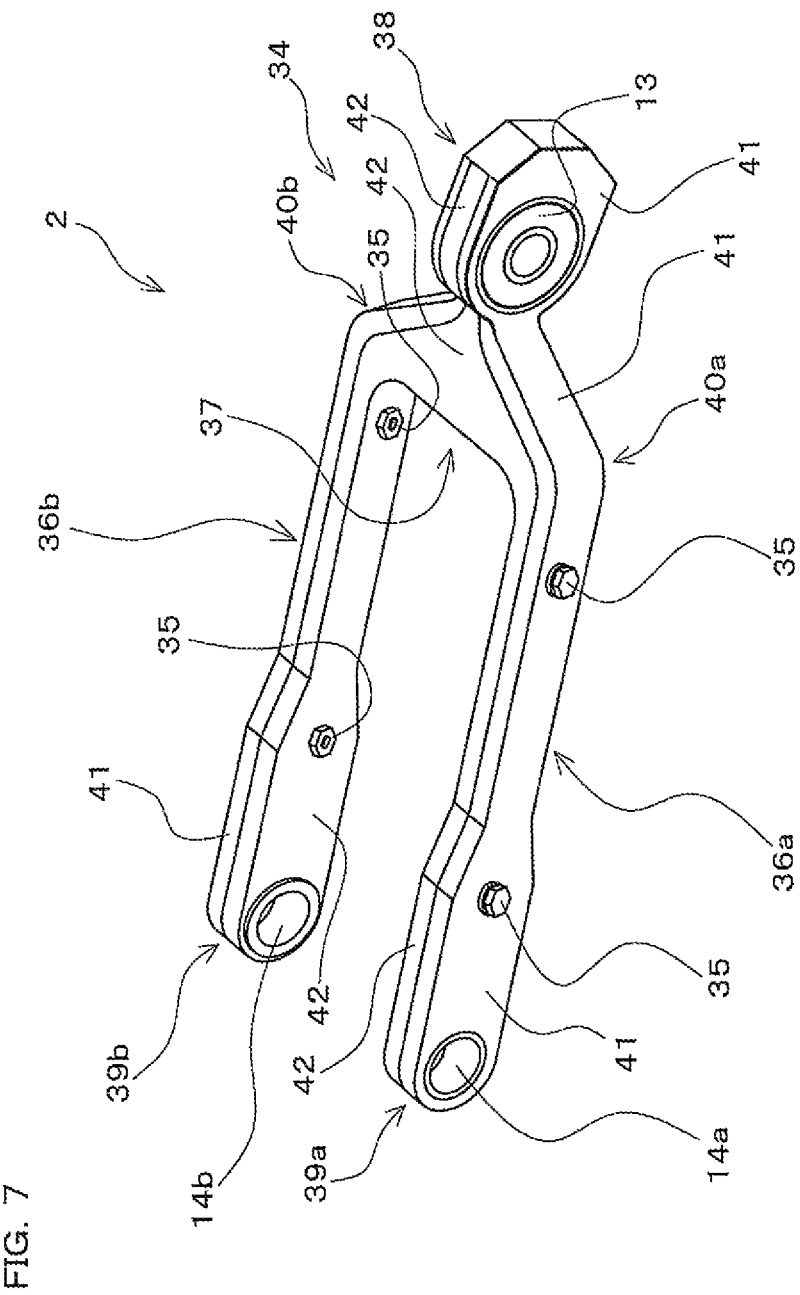
FIG. 7 is a perspective view of the aircraft reaction link shown in FIG. 6.
Figure 8:
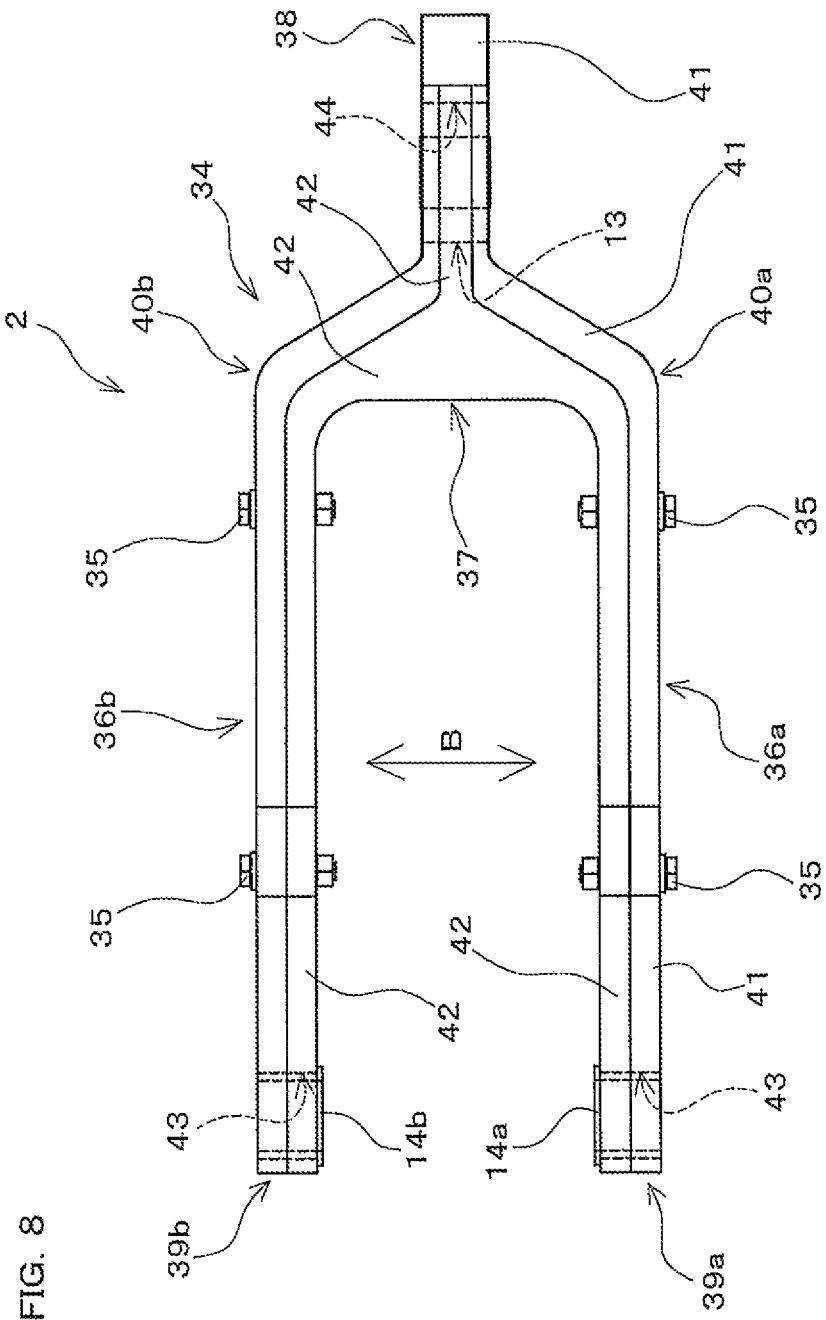
FIG. 8 is a plan view of the aircraft reaction link shown in FIG. 6.

FIG. 7 is a perspective view of the reaction link 2. FIG. 8 is a plan view of the reaction link 2. The reaction link body 34 of the reaction link 2 shown in FIGS. 6 to 8 is provided as a link element formed in the shape of a portal, and includes a pair of linear portions 36 (36a, 36b), a coupling portion 37, a fulcrum shaft attachment portion 38, and cylinder attachment portions 39. As will be described later, the reaction link body 34 includes a metal frame 41 and a composite frame 42, and is configured by bonding the metal frame 41 and the composite frame 42 together into one unit, thus forming the pair of linear portions 36, the coupling portion 37, the fulcrum shaft attachment portion 38, and the cylinder attachment portions 39 described above.

As with the pair of linear portions 22 in Embodiment 1, the pair of linear portions 36 of the reaction link body 34 are made up of a linear portion 36a and a linear portion 36b that are disposed substantially parallel to each other and each extend linearly. As with the coupling portion 23 of Embodiment 1, the coupling portion 37 is formed as a portion connecting to one end of each of the pair of linear portions 36 on the same side via bent portions (40a, 40b), and extending so as to couple those ends to each other. That is, the coupling portion 37 is formed so as to connect to one end of the linear portion 36a via the bent portion 40a, connect to one end of the linear portion 36b via the bent portion 40b, and couple those ends of the linear portion 36a and the linear portion 36b to each other.

The fulcrum shaft attachment portion 38 of the reaction link body 34 is provided so as to protrude from the center portion of the coupling portion 37 toward the control surface 102. Also, the fulcrum shaft attachment portion 38 is provided as a portion that can be attached pivotably to a fulcrum shaft 27 (see FIG. 2) via the bearing 13. Further, the fulcrum shaft attachment portion 38 is formed as a portion integrated with the coupling portion 37 and having a second through hole 44 formed inside thereof, and the outer ring of the bearing 13 is fixed by fitting to the inner wall of the second through hole 44. Consequently, the reaction link body 34 is coupled pivotably to the control surface 102 at the fulcrum shaft attachment portion 38.

The cylinder attachment portions 39 of the reaction link body 34 are provided as the other end of each of the pair of linear portions 36 that is opposite from the coupling portion 37. Also, the cylinder attachment portions 39 are made up of a cylinder attachment portion 39a that is the other end of the linear portion 36a and a cylinder attachment portion 39b that is the other end of the linear portion 36b. As with Embodiment 1, a bush 14a is attached to the cylinder attachment portion 39a and a bush 14b is attached to the cylinder attachment portion 39b. Consequently, each of the cylinder attachment portions (39a, 39b) is attached pivotably to the pivot shaft 28.

As shown in FIGS. 7 and 8, the reaction link body 34 is configured by bonding the metal frame 41 and the composite frame 42 together, thus forming the pair of linear portions 36, the coupling portion 37, the fulcrum shaft attachment portion 38, and the cylinder attachment portions 39. The metal frame 41 is made of a metallic material (e.g., titanium alloy), and is provided so as to extend from the cylinder attachment portions 39 via the pair of linear portions 36 and the coupling portion 37 to the fulcrum shaft attachment portion 38. The portion of the metal frame 41 that is provided in the pair of linear portions 36 and the coupling portion 37 is formed as a portion having a rectangular cross section and extending in a plate-like form. Further, a pair of plate-like portions extending substantially parallel to each other and having a second through hole 44, which will be described later, and a portion bridging the pair of plate-like portions so as to couple the pair of plate-like portions into one unit at their tip ends is formed in the portion of the metal frame 41 that is provided in the fulcrum shaft attachment portion 38.

The composite frame 42 is made of carbon fiber-reinforced plastic as with the composite frame 30 of Embodiment 1. Note that the composite frame 42 may be made of fiber-reinforced plastic other than carbon fiber-reinforced plastic. The composite frame 42 is provided so as to extend from the cylinder attachment portions 39 via the pair of linear portions 36 and the coupling portion 37 to the fulcrum shaft attachment portion 38, and is disposed inside the metal frame 41. Consequently, the metal frame 41 and the composite frame 42 are disposed overlapping in the width direction of the reaction link 2 (the direction indicated by double-ended arrow B in FIG. 8). Also, the composite frame 42 is bonded by the fastening members 35 to the metal frame 41 provided in the pair of linear portions 36 on inner lateral faces of the metal frame 41 in the width direction.

The fastening members 35 are each provided as a member that bonds the metal frame 41 and the composite frame 42 together such that they are integrated as the reaction link body 34. Also, the fastening members 35 are each configured as a unit including a bolt and a nut that is screwed to the bolt, and a plurality of such units (in this embodiment, four units) are provided. Also, in each of the fastening members 35, the bolt penetrates through the metal frame 41 and the composite frame 42 in the pair of linear portions 36 in the width direction of the reaction link 2, and the nut is screwed to that bolt. Consequently, the metal frame 41 and the composite frame 42 are bonded together in close contact. Note that each of the fastening members 35 is disposed at both longitudinal ends of each of the linear portions (36a, 36b).

In the reaction link body 34, a first through hole 43 that is shaped so as to pass through and communicate with the metal frame 41 and the composite frame 42 is formed in each of the cylinder attachment portions (39a, 39b) (see FIG. 8). Also, in the first through holes 43, the bushes (14a, 14b) each serving as a cylindrical slidable member that comes into slidable contact with the outer perimeter of the pivot shaft 28 are fixed from the metal frame 41 to the composite frame 42.

Further, in the reaction link body 34, the portion of the composite frame 42 that constitutes the fulcrum shaft attachment portion 38 is disposed in a fitted state between the above-described pair of plate-like portions of the metal frame 41 that constitutes the fulcrum shaft attachment portion 38. Furthermore, a second through hole 44 that is shaped so as to pass through and communicate with the metal frame 41 and the composite frame 42 is formed in the fulcrum shaft attachment portion 38 (see FIG. 8). Also, in the second through hole 44, the bearing 13 for rotatably holding the fulcrum shaft 27 is fixed across the metal frame 41 to the composite frame 42.

The reaction link 2 described above is actuated in the same manner as the reaction link 1 of Embodiment 1. That is, the reaction link 2 is actuated along with the cylinder 11, and thereby the control surface 102 is driven so as to pivot about the fulcrum shaft 27.

As described above, with the aircraft reaction link 2, the pair of linear portions 36 and the coupling portion 37 of the reaction link body 34 are formed by bonding the metal frame 41 and the composite frame 42 together. The composite frame 42 is made of fiber-reinforced plastic, which has a significantly smaller specific gravity and a significantly greater specific strength than light metal such as titanium alloy. Accordingly, it is possible to achieve weight reduction as compared to conventional aircraft reaction links made of metal such as titanium alloy, and to secure strength and rigidity that are equal to or greater than those achieved with conventional reaction links. Furthermore, with the aircraft reaction link 2, the metal frame 41 is provided so as to extend from the fulcrum shaft attachment portion 38 via the coupling portion 37 and the pair of linear portions 36 to the cylinder attachment portions 39, and therefore a sufficient rigidity against a multi-directional load exerted on the aircraft reaction link 2 formed in the shape of a portal can also be secured.

Accordingly, with this embodiment, it is possible to provide an aircraft reaction link 2 that can secure strength and rigidity that are equal to or greater than those achieved with conventional aircraft reaction links, while achieving weight reduction, and also to secure a sufficient rigidity against a multi-directional load.

Furthermore, with the aircraft reaction link 2, the composite frame 42 is bonded to the metal frame 41 on inner lateral faces of the metal frame 41 in the width direction, and thereby, the metal frame 41 and the composite frame 42 are integrated into one unit in a state in which they overlap each other in the width direction. Accordingly, it is possible to efficiently disperse and support the load in the longitudinal direction in the metal frame 41 and the composite frame 42 that extend along the pair of linear portions 36, while also suppressing the occurrence of an unbalanced load in the width direction. This makes it possible to efficiently secure a greater rigidity as the aircraft reaction link 2 as a whole.

Further, with the aircraft reaction link 2, the composite frame 42 is provided from the pair of linear portions 36 to the cylinder attachment portions 39, and therefore it is possible to achieve a further weight reduction. Also, the first through holes 43 passing through both the metal frame 41 and the composite frame 42 are provided in the cylinder attachment portions 39, and the bushes 14 for rotatably holding the pivot shafts 28 are fixed to both the metal frame 41 and the composite frame 42 in the first through holes 43. Accordingly, it is possible to realize a structure in which the aircraft reaction link 2 for which weight reduction has been achieved even for the cylinder attachment portions 39 can be supported relative to the pivot shafts 28 more stably.

Further, with the aircraft reaction link 2, the composite frame 42 is provided from the pair of linear portions 36 to the fulcrum shaft attachment portion 38, and therefore it is possible to achieve a further weight reduction. Also, the second through hole 44 passing through both the metal frame 41 and the composite frame 42 is formed in the fulcrum shaft attachment portion 38, and the bearing 13 for rotatably supporting the fulcrum shaft 27 is fixed to both the metal frame 41 and the composite frame 42 in the second through hole 44. Accordingly, it is possible to realize a structure in which the aircraft reaction link 2 for which weight reduction has been achieved even for the fulcrum shaft attachment portion 38 can be supported relative to the fulcrum shaft 27 more stably.

Embodiment 3

Figure 9:
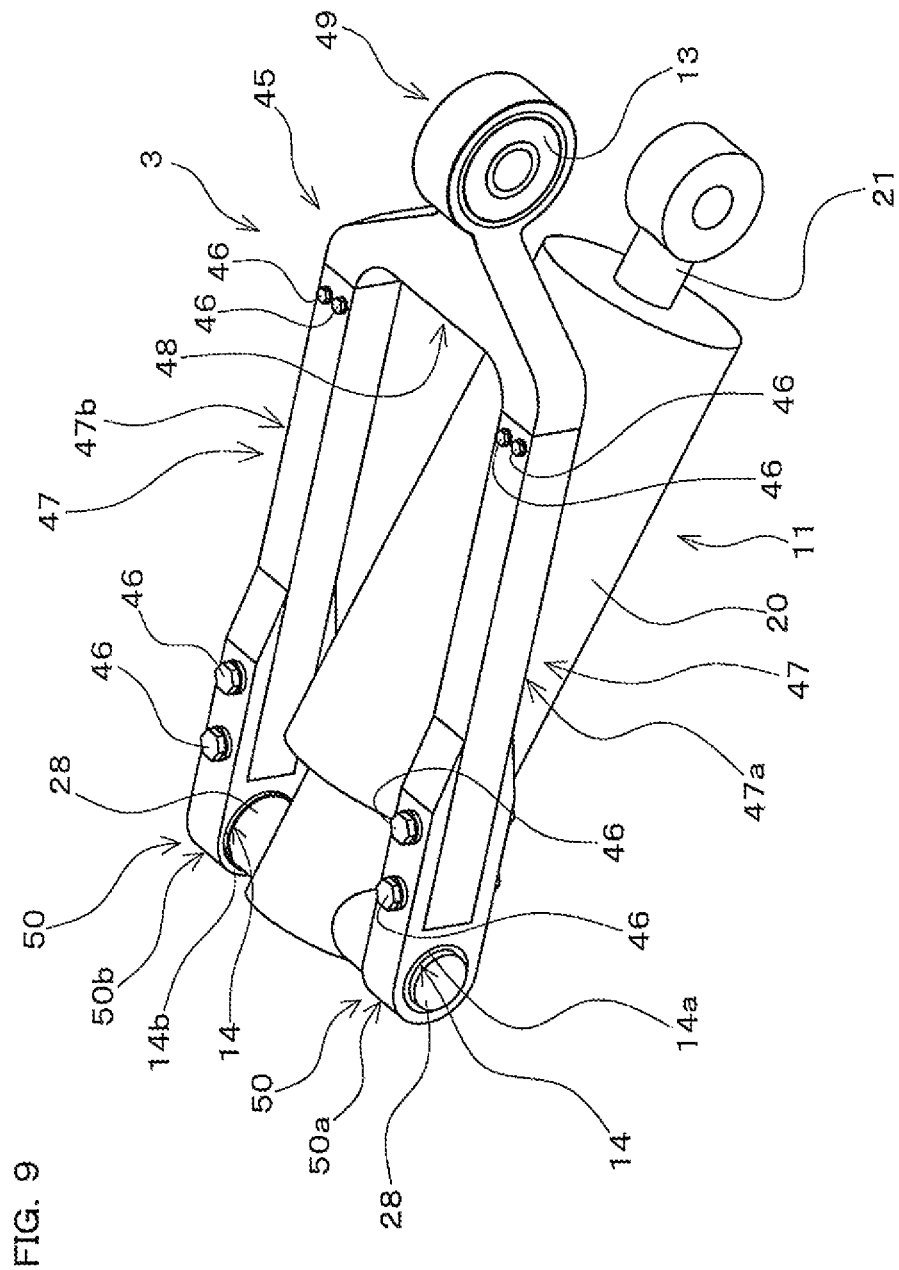
FIG. 9 is a perspective view showing an aircraft reaction link according to Embodiment 3 of the present invention, together with a cylinder.

Next, an aircraft reaction link 3 (hereinafter, may also be simply referred to as a "reaction link 3") according to Embodiment 3 of the present invention will be described. FIG. 9 is a perspective view showing the reaction link 3 together with a cylinder 11. As with the reaction link 1 of Embodiment 1, the reaction link 3 is used as a constituent component of an actuator for driving a control surface 102 of an aircraft, and is attached to a body frame 101 of a body 100 (see FIG. 2). As with Embodiment 1, the reaction link 3 is coupled pivotably to the control surface 102 and the cylinder 11, and includes a reaction link body 45, a bearing 13, bushes 14, fastening members 46 and so forth. However, the reaction link 3 is different from the reaction link 1 of Embodiment 1 in the configuration of the reaction link body 45. In the following description of the reaction link 3, the differences in configuration from Embodiment 1 will be described. The description of those elements configured in the same manner as in Embodiment 1 has been omitted by using the same reference numerals in the drawings, or by referring to the same reference numerals.

Figure 10:
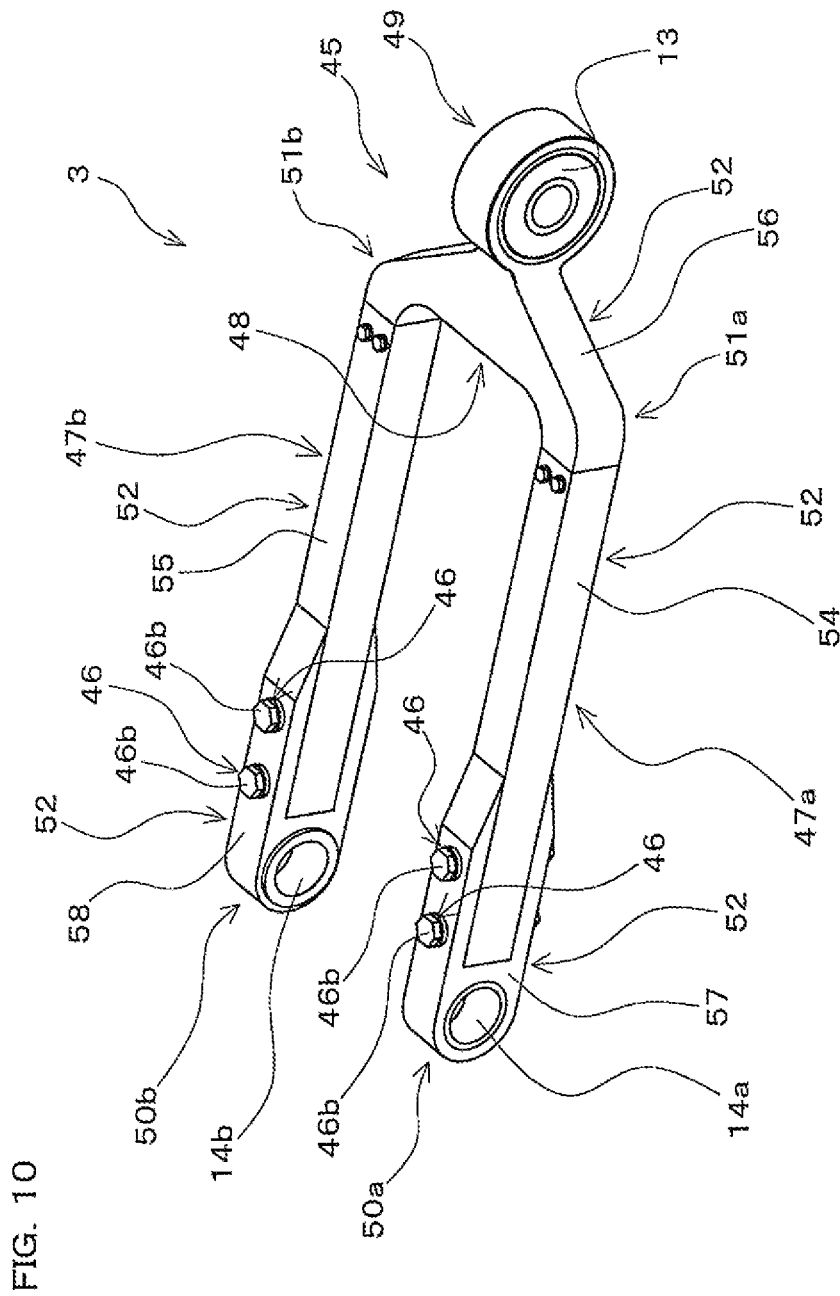
FIG. 10 is a perspective view of the aircraft reaction link shown in FIG. 9.
Figure 11:
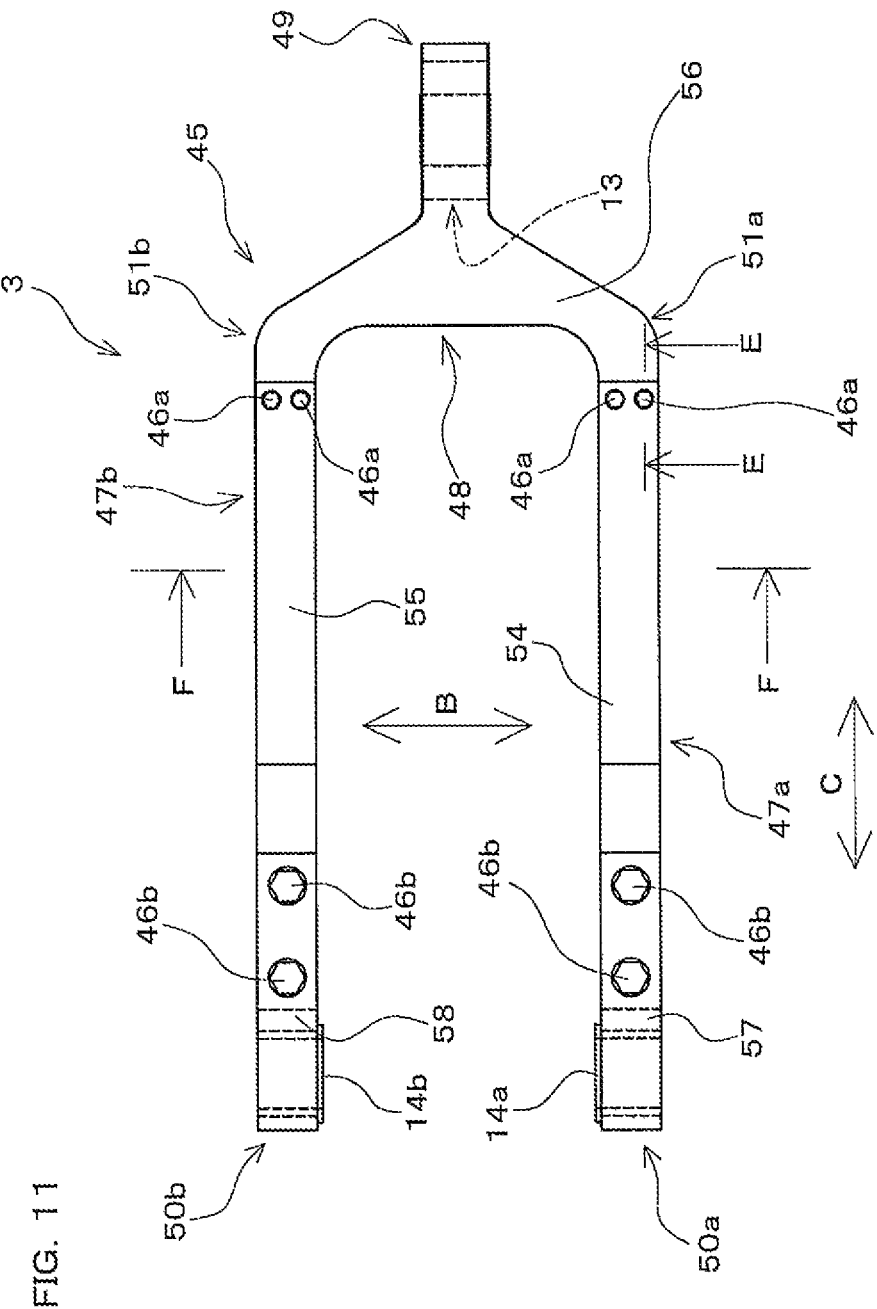
FIG. 11 is a plan view of the aircraft reaction link shown in FIG. 9.
Figure 12:
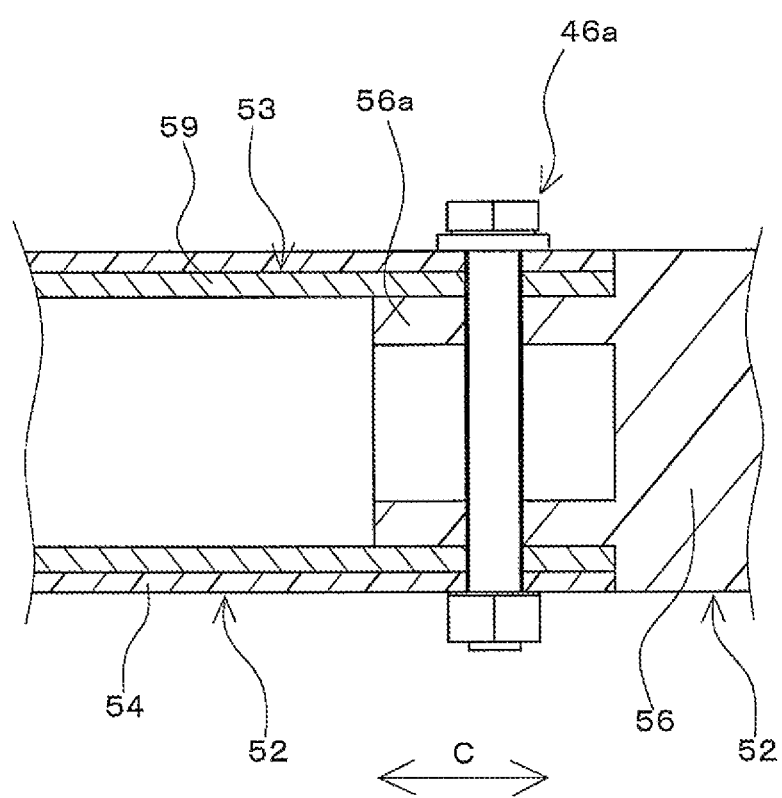
FIG. 12 is a cross-sectional view looking in the direction of arrows E-E in FIG. 11.
Figure 13:
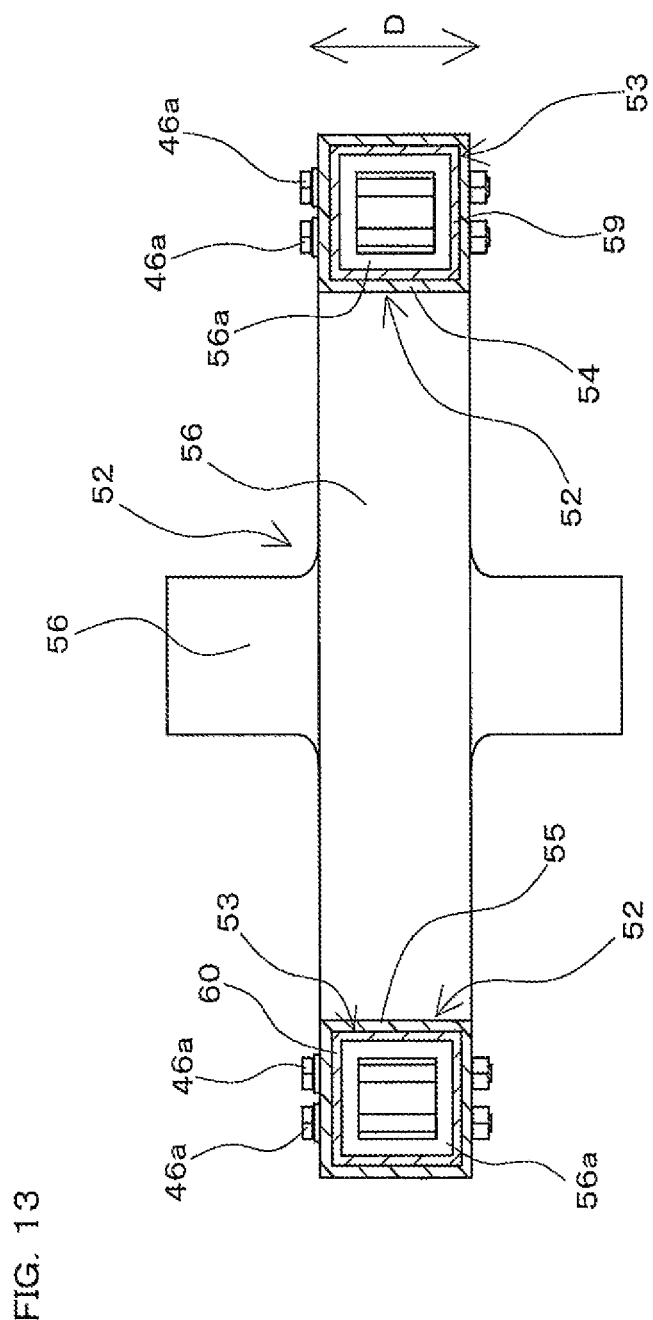
FIG. 13 is a cross-sectional view looking in the direction of arrows F-F in FIG. 11.

FIG. 10 is a perspective view of the reaction link 3, and FIG. 11 is a plan view of the reaction link 3. FIG. 12 is a cross-sectional view looking in the direction of arrow E-E in FIG. 11, and FIG. 13 is a cross-sectional view looking in the direction of arrow F-F in FIG. 11. The reaction link body 45 of the reaction link 3 shown in FIGS. 9 to 13 is provided as a link element formed in the shape of a portal, and includes a pair of linear portions 47 (47a, 47b), a coupling portion 48, a fulcrum shaft attachment portion 49, and cylinder attachment portions 50. The reaction link body 45 includes, as will be described later, a metal frame 52 and a composite frame 53, and the metal frame 52 and the composite frame 53 are bonded together into one unit, thus forming the pair of linear portions 47 and the coupling portion 48 described above.

As with the pair of linear portions 22 in Embodiment 1, the pair of linear portions 47 of the reaction link body 45 are made up of a linear portion 47a and a linear portion 47b that are disposed substantially parallel to each other and each extend linearly. As with the coupling portion 23 of Embodiment 1, the coupling portion 48 is formed as a portion connecting to one end of each of the pair of linear portions 47 on the same side via bent portions (51a, 51b), and extending so as to couple those ends to each other. That is, the coupling portion 48 is formed so as to connect to one end of the linear portion 47a via the bent portion 51a, connect to one end of the linear portion 47b via the bent portion 51b, and couple those ends of the linear portion 47a and the linear portion 47b to each other.

The fulcrum shaft attachment portion 49 of the reaction link body 45 is provided so as to protrude from the center portion of the coupling portion 48 toward the control surface 102. Also, the fulcrum shaft attachment portion 49 is provided as a portion that can be attached pivotably to a fulcrum shaft 27 (see FIG. 2) via the bearing 13. Furthermore, the fulcrum shaft attachment portion 49 is formed as a cylindrical portion integrated with the coupling portion 48 and having a shorter axial length, and the outer ring of the bearing 13 is fixed by fitting to the inner wall of the fulcrum shaft attachment portion 49. Consequently, the reaction link body 45 is coupled pivotably to the control surface 102 at the fulcrum shaft attachment portion 49.

The cylinder attachment portions 50 of the reaction link body 45 are provided as the other end of each of the pair of linear portions 47 that is opposite from the coupling portion 48. Also, the cylinder attachment portions 50 are made up of a cylinder attachment portion 50a that is the other end of the linear portion 47a and a cylinder attachment portion 50b that is the other end of the linear portion 47b. As with Embodiment 1, a bush 14a is attached to the cylinder attachment portion 50a, and a bush 14b is attached to the cylinder attachment portion 50b. Consequently, each of the cylinder attachment portions (50a, 50b) is attached pivotably to the pivot shaft 28.

As shown in the cross-sectional views in FIGS. 12 and 13, the reaction link body 45 is configured by bonding the metal frame 52 and the composite frame 53 together, thus forming the pair of linear portions 47. The metal frame 52 is made of a metallic material (e.g., titanium alloy), is provided so as to extend from the fulcrum shaft attachment portion 49 via the coupling portion 48 and the pair of linear portions 47 to the cylinder attachment portions 50, and includes pipe members (54, 55), a coupling member 56, and end members (57, 58).

The pipe members (54, 55) each constitute a metal pipe portion of this embodiment that is provided in the pair of linear portions 47 and are each formed in the shape of a pipe having a hollow cross section. The pipe member 54 is provided so as to extend in the linear portion 47a, and the pipe member 55 is provided so as to extend in the linear portion 47b. In this embodiment, the pipe members (54, 55) are each provided as a square pipe-like member. The coupling member 56 is provided as a member constituting the coupling portion 48 and the fulcrum shaft attachment portion 49, and the pipe members (54, 55) and the composite frame 53 are bonded together by fastening members 46a, which will be described later.

The end members (57, 58) are each formed as a member constituting a part of the surface portion of the other end of each of the cylinder attachment portions 50 and the linear portions (47a, 47b). The end member 57 is provided with the cylinder attachment portion 50a and a pair of protruding portions formed in the shape of plates extending parallel to each other and protruding from the cylinder attachment portion 50a in the longitudinal direction of the linear portion 47a. Likewise, the end member 58 is provided with the cylinder attachment portion 50b and a pair of protruding portions formed in the shape of plates extending parallel to each other and protruding from the cylinder attachment portion 50b in the longitudinal direction of the linear portion 47b. Also, the pairs of protruding portions of each of the end members (57, 58) constitute the surface portion on both sides in the thickness direction at the other end of each of the linear portions (47a, 47b). The end members (57, 58) are bonded to the pipe members (54, 55) and the composite frame 53 via fastening members 46b, which will be described later.

The composite frame 53 shown in FIGS. 12 and 13 is made of carbon fiber-reinforced plastic as with the composite frame 30 of Embodiment 1. Note that the composite frame 53 may be made of fiber-reinforced plastic other than carbon fiber-reinforced plastic. The composite frame 53 includes pipe members (59, 60).

The pipe members (59, 60) each constitute a composite pipe portion of this embodiment that is provided in the pair of linear portions 47 and are each formed in the shape of a pipe having a hollow cross section. The pipe member 59 is provided so as to extend in the linear portion 47*a*, and the pipe member 60 is provided so as to extend in the linear portion 47*b*. In this embodiment, the pipe members (59, 60) are each provided as a square pipe-like member. Further, the pipe member 59 is disposed inside the pipe member 54 of the metal frame 52, and the pipe member 60 is disposed inside the pipe member 55 of the metal frame 52. Also, the pipe member 54 and the pipe member 59 are bonded together as a double tube in which the inner wall of the pipe member 54 and the outer wall of the pipe member 59 are in close contact. Likewise, the pipe member 55 and the pipe member 60 are bonded together as a double tube in which the inner wall of the pipe member 55 and the outer wall of the pipe member 60 are in close contact.

The fastening members 46 are each provided as a member that bonds the metal frame 52 and the composite frame 53 together into one unit as the reaction link body 45. Fastening members 46*a* and fastening members 46*b* are provided as the fastening members 46. The fastening members 46*a* are each provided as a member that bonds the pipe members (54, 55) of the metal frame 52 and the coupling member 56 to the pipe members (59, 60) of the composite frame 53. The fastening members 46*b* are each provided as a member that bonds the pipe members (54, 55) and the end members (57, 58) of the metal frame 52 to the pipe members (59, 60) of the composite frame 53.

The fastening members 46*a* are each configured as a unit including a bolt and a nut that is screwed to the bolt, and a plurality of such units (in this embodiment, four units) are provided. Also, in each of the fastening members 46*a*, the bolt penetrates through an end of each of the pipe members (54, 55), an end of each of the pipe members (59, 60), and an end of the coupling member 56 in the thickness direction of the reaction link 3 (the direction indicated by double-ended arrow D in FIG. 13), and the nut is screwed to the bolt. As shown in FIGS. 12 and 13, joint portions 56*a* extending in the shape of a short square pipe are provided at ends of the coupling member 56. Also, the pipe members (54, 55), the pipe members (59, 60), and the coupling member 56 are bonded together in a state in which each of the pipe members (59, 60) is fitted inside each of the pipe members (54, 55) and each of the joint portions 56*a* is fitted inside each of the pipe members (59, 60). Note that two fastening members 46*a* are disposed alongside each other in the width direction of the reaction link 3 (the direction indicated by double-ended arrow B in FIG. 11) in each of the bonded portions between the coupling portion 48 and the linear portions (47*a*, 47*b*).

As described above, in the bonded portions between the coupling portion 48 and the pair of linear portions 47, the metal frames 52 (54, 55, 56) are provided on both the side of the pair of linear portions 47 and the coupling portion 48 side. Accordingly, even if a tensile load is exerted between the coupling portion 48 and the pair of linear portions 47 in the longitudinal direction of the pair of linear portions 47 (the direction indicated by double-ended arrow C in FIGS. 11 and 12), it is possible to prevent the tensile load from being concentrated at ends of the composite frame 53. This makes it possible to prevent the composite frame 53 from being damaged by a tensile load exerted in the longitudinal direction of the pair of linear portions 47.

The fastening members 46*b* are each configured as a unit including a bolt and a nut that is screwed to the bolt, and a plurality of such units (in this embodiment, four units) are provided. Also, in each of the fastening members 46*b*, the bolt penetrates through the pair of protruding potions of the end members (57, 58), an end of each of the pipe members (54, 55), and an end of each of the pipe members (59, 60) in the thickness direction of the reaction link 3, and the nut is screwed to the bolt. Note that the end members (57, 58), the pipe members (54, 55), and the pipe members (59, 60) are bonded together in a state in which each of the pipe members (54, 55) is fitted between the pair of protruding portions of each of the end members (57, 58), and each of the pipe members (59, 60) is fitted inside each of the pipe members (54, 55). Note that two fastening members 46*b* are disposed alongside each other in the longitudinal direction of the pair of linear portions 47 in each of the bonded portions between the end members (57, 58) and the pipe members (54, 55, 59, 60).

As described above, in the bonded portions between the end members (57, 58) and the pipe members (54, 55, 59, 60), the metal frames 52 (54, 55, 57, 58) is provided for both bonded portions. Accordingly, even if a tensile load is exerted at the above-described bonded portions in the longitudinal direction of the pair of linear portions 47, it is possible to prevent the tensile load from being concentrated at ends of the composite frame 53. This makes it possible to prevent the composite frame 53 from being damaged by a tensile load exerted in the longitudinal direction of the pair of linear portions 47.

The reaction link 3 described above is actuated in the same manner as the reaction link 1 of Embodiment 1. That is, the reaction link 3 is actuated along with the cylinder 11, and thereby the control surface 102 is driven so as to pivot about the fulcrum shaft 27.

As described above, with the aircraft reaction link 3, the pair of linear portions 47 and the coupling portion 48 of the reaction link body 45 are formed by bonding the metal frame 52 and the composite frame 53 together. The composite frame 53 is made of fiber-reinforced plastic, which has a significantly smaller specific gravity and a significantly greater specific strength than light metal such as titanium alloy. Accordingly, it is possible to achieve weight reduction as compared to conventional aircraft reaction links made of metal such as titanium alloy, and to secure strength and rigidity that are equal to or greater than those achieved with conventional reaction links. Furthermore, with the aircraft reaction link 3, the metal frame 52 is provided so as to extend from the fulcrum shaft attachment portion 49 via the coupling portion 48 and the pair of linear portions 47 to the cylinder attachment portions 50, and therefore a sufficient rigidity against a multi-directional load exerted on the aircraft reaction link 3 formed in the shape of a portal can also be secured.

Accordingly, with this embodiment, it is possible to provide an aircraft reaction link 3 that can secure strength and rigidity that are equal to or greater than those achieved with conventional aircraft reaction links, while achieving weight reduction, and also to secure a sufficient rigidity against a multi-directional load.

Furthermore, with the aircraft reaction link 3, the metal frame 52 and the composite frame 53 include their respective pipe members (54, 55, 59, 60) that are pipe portions each having a hollow cross section, and these pipe portions are bonded together in close contact as a double tube, and integrated into one unit. Accordingly, it is possible to efficiently disperse and support the load in the longitudinal direction in the metal frame 52 and the composite frame 53 that extend along the pair of linear portions 47, while also suppressing the occurrence of an unbalanced load in a cross section perpendicular to the longitudinal direction. Since the metal frame 52 and the composite frame 53 are formed in the shape of a pipe in the pair of linear portions 47, it is possible to easily set the geometrical moment of inertia large, while realizing a configuration with a reduced weight. This makes it possible to efficiently secure a greater rigidity as the aircraft reaction link 3 as a whole.

This embodiment is described, taking as an example, the aircraft reaction link 3 in which the pipe members (54, 55), which are the metal pipe portions, are disposed outside the pipe members (59, 60), which are the composite pipe portions. However, this need not be the case, and an aircraft reaction link may be implemented in which the pipe members provided as the composite pipe portions are disposed outside the pipe members provided as the metal pipe portions. For a reaction link 3 in which the metal pipe portions are disposed externally in the pair of linear portions 47 as with this embodiment, the metal pipe portions serve as electric conductors in case of a lightning strike during the flight of an aircraft, thus easily passing and releasing the lightning current to the aircraft body. This makes it possible to achieve anti-lightning performance that enables avoiding or suppressing the influence of a lightning strike.

Embodiment 4

Figure 14:
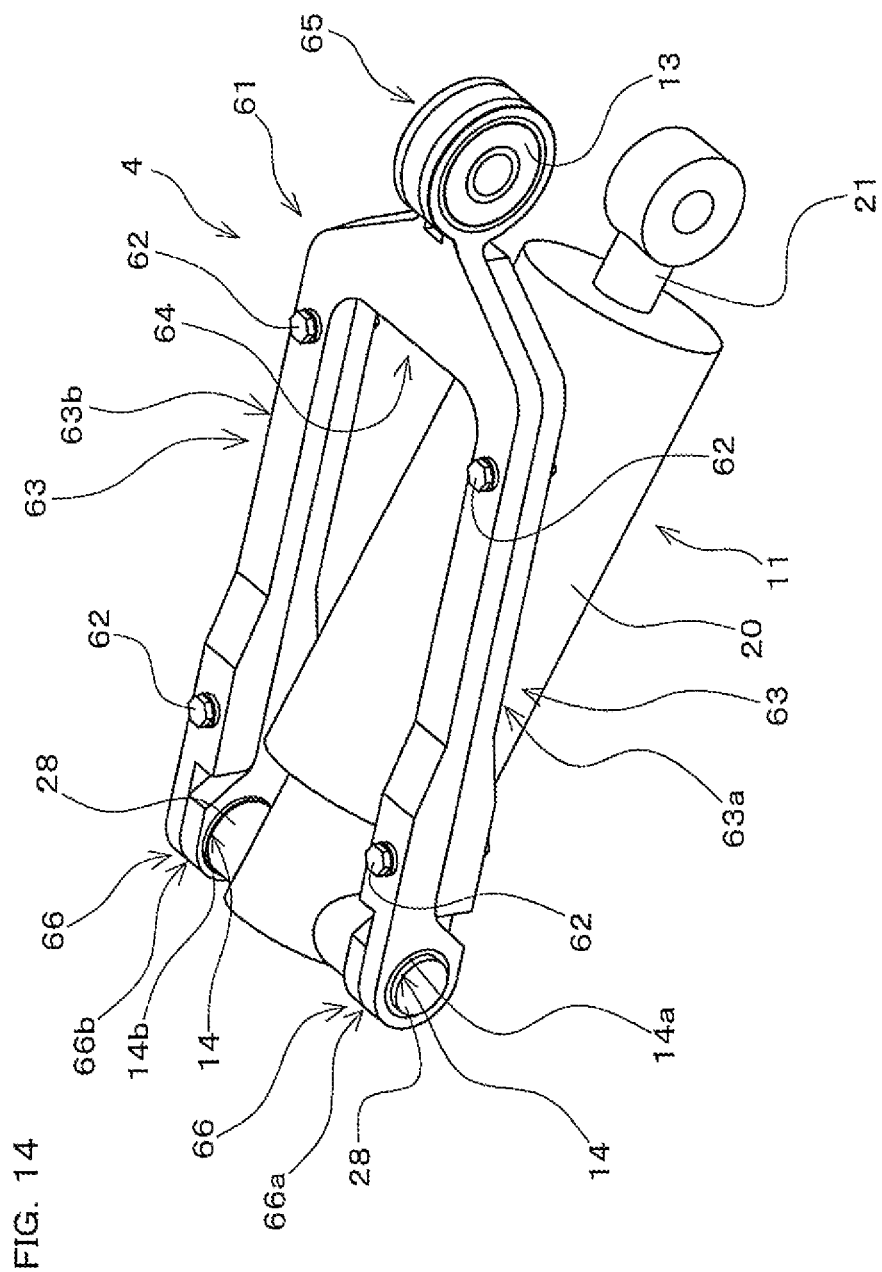
FIG. 14 is a perspective view showing an aircraft reaction link according to Embodiment 4 of the present invention, together with a cylinder.

Next, an aircraft reaction link 4 (hereinafter, may also be simply referred to as a "reaction link 4") according to Embodiment 4 of the present invention will be described. FIG. 14 is a perspective view showing the reaction link 4 together with a cylinder 11. As with the reaction link 1 of Embodiment 1, the reaction link 4 is used as a constituent component of an actuator for driving a control surface 102 of an aircraft, and is attached to a body frame 101 of a body 100 (see FIG. 2). As with Embodiment 1, the reaction link 4 is coupled pivotably to the control surface 102 and the cylinder 11, and includes a reaction link body 61, a bearing 13, bushes 14, fastening members 62 and so forth. However, the reaction link 4 is different from the reaction link 1 of Embodiment 1 in the configuration of the reaction link body 61. In the following description of the reaction link 4, the differences in configuration from Embodiment 1 will be described. The description of those elements configured in the same manner as in Embodiment 1 has been omitted by using the same reference numerals in the drawings, or by referring to the same reference numerals.

Figure 15:
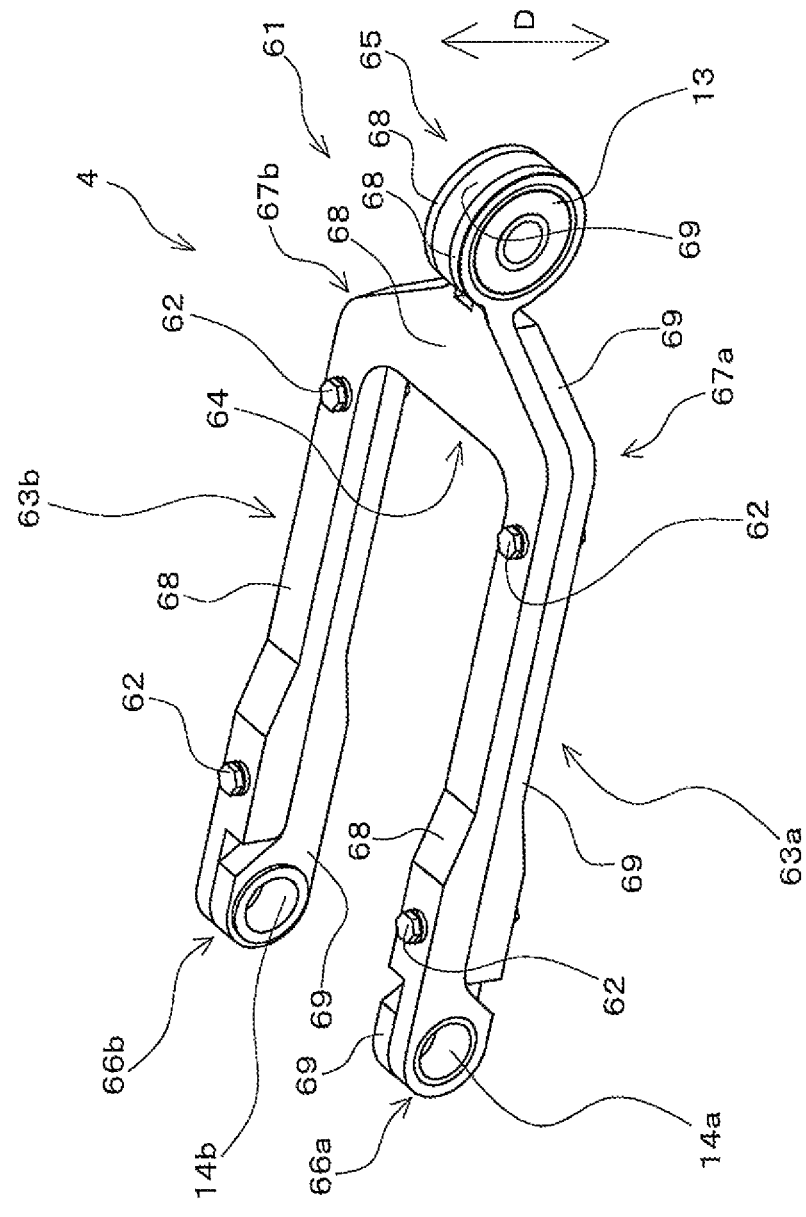
FIG. 15 is a perspective view of the aircraft reaction link shown in FIG. 14.
Figure 16:
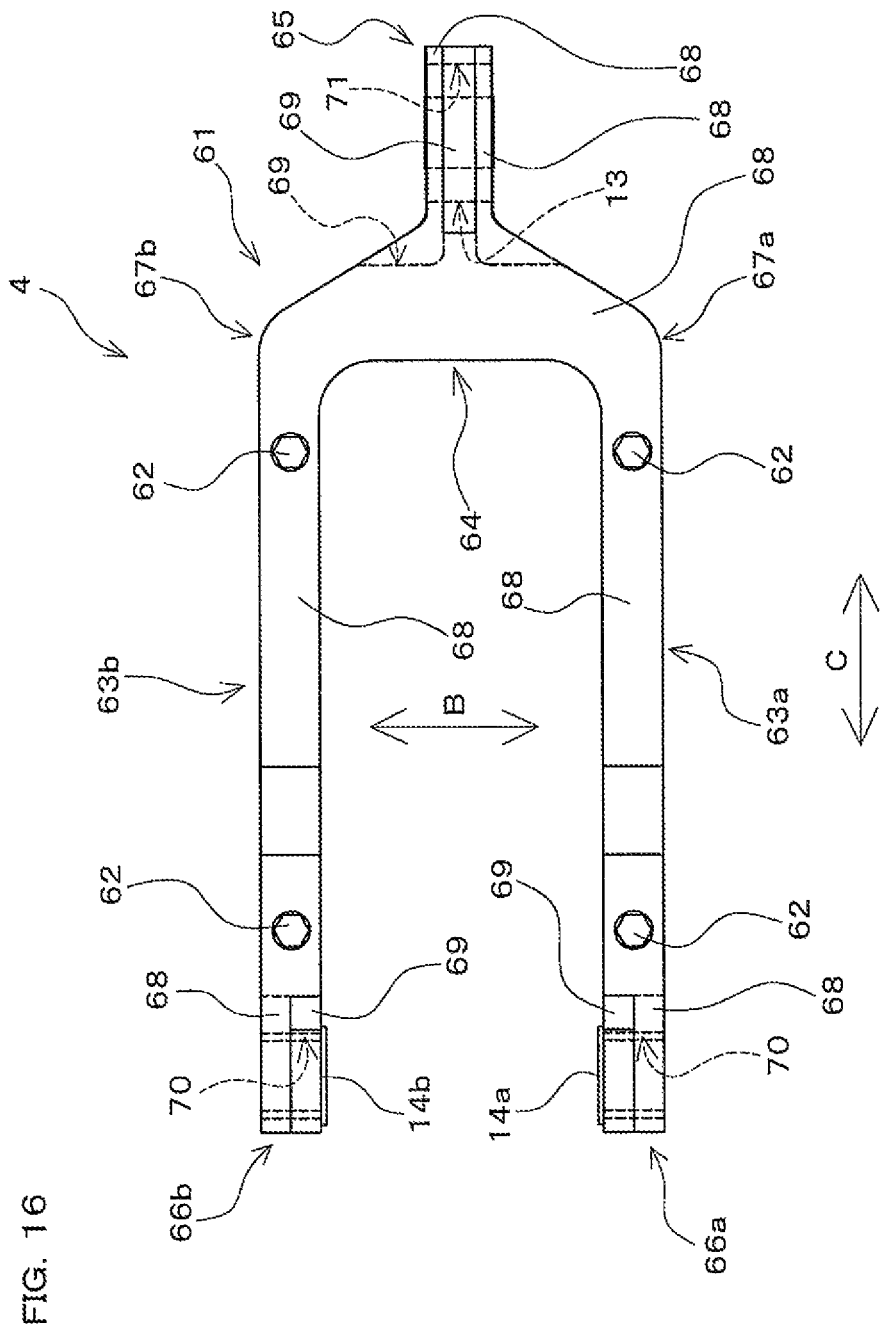
FIG. 16 is a plan view of the aircraft reaction link shown in FIG. 14.

FIG. 15 is a perspective view of the reaction link 4. FIG. 16 is a plan view of the reaction link 4. The reaction link body 61 of the reaction link 4 shown in FIGS. 14 to 16 is provided as a link element formed in the shape of a portal, and includes a pair of linear portions 63 (63a, 63b), a coupling portion 64, a fulcrum shaft attachment portion 65, and cylinder attachment portions 66. As will be described later, the reaction link body 61 includes a metal frame 68 and a composite frame 69, and is configured by bonding the metal frame 68 and the composite frame 69 together into one unit, thus forming the pair of linear portions 63, the coupling portion 64, the fulcrum shaft attachment portion 65, and the cylinder attachment portions 66 described above.

As with the pair of linear portions 22 in Embodiment 1, the pair of linear portions 63 of the reaction link body 61 are made up of a linear portion 63a and a linear portion 63b that are disposed substantially parallel to each other and each extend linearly. As with the coupling portion 23 of Embodiment 1, the coupling portion 64 is formed as a portion connecting to one end of each of the pair of linear portions 63 on the same side via bent portions (67a, 67b), and extending so as to couple those ends to each other. That is, the coupling portion 64 is formed so as to connect to one end of the linear portion 63a via the bent portion 67a, connect to one end of the linear portion 63b via the bent portion 67b, and couple those ends of the linear portion 63a and the linear portion 63b to each other.

The fulcrum shaft attachment portion 65 of the reaction link body 61 is provided so as to protrude from the center portion of the coupling portion 64 toward the control surface 102. Also, the fulcrum shaft attachment portion 65 is provided as a portion that can be attached pivotably to a fulcrum shaft 27 (see FIG. 2) via the bearing 13. Further, the fulcrum shaft attachment portion 65 is formed as a cylindrical portion integrated with the coupling portion 64 and having a shorter axial length, and the outer ring of the bearing 13 is fixed by fitting to the inner wall of the fulcrum shaft attachment portion 65. Consequently, the reaction link body 61 is coupled pivotably to the control surface 102 at the fulcrum shaft attachment portion 65.

The cylinder attachment portions 66 of the reaction link body 61 are provided as the other end of each of the pair of linear portions 63 that is opposite from the coupling portion 64. Also, the cylinder attachment portions 66 are made up of a cylinder attachment portion 66a that is the other end of the linear portion 63a and a cylinder attachment portion 66b that is the other end of the linear portion 63b. As with Embodiment 1, a bush 14a is attached to the cylinder attachment portion 66a and a bush 14b is attached to the cylinder attachment portion 66b. Consequently, each of the cylinder attachment portions (66a, 66b) is attached pivotably to the pivot shaft 28.

As shown in FIGS. 15 and 16, the reaction link body 61 is configured by bonding the metal frame 68 and the composite frame 69 together, thus forming the pair of linear portions 63, the coupling portion 64, the fulcrum shaft attachment portion 65, and the cylinder attachment portions 66. The metal frame 68 is made of a metallic material (e.g., titanium alloy), and is provided so as to extend from the cylinder attachment portions 66 via the pair of linear portions 63 and the coupling portion 64 to the fulcrum shaft attachment portion 65. Also, most of the portion of the metal frame 68 that is provided in the pair of linear portions 63 and the coupling portion 64 is formed as a portion extending in a plate-like form. Further, a pair of ring-like portions disposed substantially parallel to each other and having a fourth through hole 71, which will be described later, provided therein are formed in the portion of the metal frame 68 that is provided in the fulcrum shaft attachment portion 65.

The composite frame 69 is made of carbon fiber-reinforced plastic as with the composite frame 30 of Embodiment 1. Note that the composite frame 69 may be made of fiber-reinforced plastic other than carbon fiber-reinforced plastic. The composite frame 69 is provided so as to extend from the cylinder attachment portions 66 via the pair of linear portions 63 and the coupling portion 64 to the fulcrum shaft attachment portion 65. Also, the metal frame 68 and the composite frame 69 are disposed overlapping in the thickness direction of the reaction link 4 (the direction indicated by double-ended arrow D in FIG. 15) and bonded together by fastening members 62 in the major portion of the pair of linear portions 63 that includes the center portion (the portion excluding the other end of the pair of linear portions 63) in the longitudinal direction (the direction indicated by double-ended arrow C in FIG. 16).

The fastening members 62 are each provided as a member that bonds the metal frame 68 and the composite frame 69 together such that they are integrated as the reaction link body 61. Also, the fastening members 62 are each configured as a unit including a bolt and a nut that is screwed to the bolt, and a plurality of such units (in this embodiment, four units) are provided. Also, in each of the fastening members 62, the bolt penetrates through the metal frame 68 and the composite frame 69 in the pair of linear portions 63 in the thickness direction of the reaction link 4, and the nut is screwed to that bolt. Consequently, the metal frame 68 and the composite frame 69 are bonded together in close contact in the thickness direction. Note that each of the fastening members 62 is disposed at both longitudinal ends of each of the linear portions (63a, 63b).

Further, in the reaction link body 61, a third through hole 70 (see FIG. 16) that is shaped so as to pass through and communicate with an end of each of the metal frame 68 and the composite frame 69 (the portion constituting the cylinder attachment portions 66) that are disposed overlapping in the width direction of the reaction link 4 (the direction indicated by double-ended arrow B in FIG. 16) is provided in each of the cylinder attachment portions (66a, 66b). Also, in the first through holes 70, the bushes (14a, 14b) each serving as a cylindrical slidable member that comes into slidable contact with the outer perimeter of the pivot shaft 28 are fixed from the metal frame 68 to the composite frame 69.

Note that this embodiment illustrates a configuration in which an end of the metal frame 68 is disposed outside in the width direction and an end of the composite frame 69 is disposed inside in the width direction in the cylinder attachment portions (66a, 66b). As described above, in this embodiment, the metal frame 68 and the composite frame 69 are configured to be bonded together in the major portion of the coupling portion 64 and the pair of linear portions 63 in a state in which they overlap in the thickness direction, and to be bonded together in the cylinder attachment portions 66 in a state in which they overlap in the width direction. Accordingly, the reaction link body 61 is provided with a portion that is formed such that a flat portion extends toward a skew position in each of the metal frame 68 and the composite frame 69 at the cylinder attachment portions (66a, 66b).

Further, in the reaction link body 61, the ring-like portion of the composite frame 69 that constitutes the fulcrum shaft attachment portion 65 is disposed in a fitted state between the above-described pair of ring-like portions of the metal frame 68 that constitutes the fulcrum shaft attachment portion 65. Furthermore, a fourth through hole 71 that is shaped so as to pass through and communicate with an end of each of the metal frame 68 and the composite frame 69 (the portion constituting the fulcrum shaft attachment portion 65) that are disposed overlapping in the width direction is formed in the fulcrum shaft attachment portion 65 (see FIG. 16). Also, in the fourth through hole 71, the bearing 13 for rotatably holding the fulcrum shaft 27 is fixed across the metal frame 68 to the composite frame 69.

Note that this embodiment illustrates a configuration in which an end of the metal frame 68 is disposed outside in the width direction and an end of the composite frame 69 is disposed inside in the width direction in the fulcrum shaft attachment portion 65. As described above, in this embodiment, the metal frame 68 and the composite frame 69 are configured to be bonded together in the major portion of the coupling portion 64 and the pair of linear portions 63 in a state in which they overlap in the thickness direction, and to be bonded together in the fulcrum shaft attachment portion 65 in a state in which they overlap in the width direction. Accordingly, the reaction link body 61 is provided with a portion that is formed such that a flat portion extends toward a skew position in each of the metal frame 68 and the composite frame 69 at the fulcrum shaft attachment portion 65.

The reaction link 4 described above is actuated in the same manner as the reaction link 1 of Embodiment 1. That is, the reaction link 4 is actuated along with the cylinder 11, and thereby the control surface 102 is driven so as to pivot about the fulcrum shaft 27.

As described above, with the aircraft reaction link 4, the pair of linear portions 63 and the coupling portion 64 of the reaction link body 61 are formed by bonding the metal frame 68 and the composite frame 69 together. The composite frame 69 is made of fiber-reinforced plastic, which has a significantly smaller specific gravity and a significantly greater specific strength than light metal such as titanium alloy. Accordingly, it is possible to achieve weight reduction as compared to conventional aircraft reaction links made of metal such as titanium alloy, and to secure strength and rigidity that are equal to or greater than those achieved with conventional reaction links. Furthermore, with the aircraft reaction link 4, the metal frame 68 is provided so as to extend from the fulcrum shaft attachment portion 65 via the coupling portion 64 and the pair of linear portions 63 to the cylinder attachment portions 66, and therefore a sufficient rigidity against a multi-directional load exerted on the aircraft reaction link 4 formed in the shape of a portal can also be secured.

Accordingly, with this embodiment, it is possible to provide an aircraft reaction link 4 that can secure strength and rigidity that are equal to or greater than those achieved with conventional aircraft reaction links, while achieving weight reduction, and also to secure a sufficient rigidity against a multi-directional load.

Furthermore, with the aircraft reaction link 4, the metal frame 68 and the composite frame 69 are bonded together and integrated into one unit in a state in which they overlap each other in the thickness direction in the major portion of the pair of linear portions 63 that includes the center portion in the longitudinal direction. Accordingly, it is possible to efficiently disperse and support the load in the longitudinal direction in the metal frame 68 and the composite frame 69 that extend along the pair of linear portions 63, while also suppressing the occurrence of an unbalanced load in the thickness direction. This makes it possible to efficiently secure a greater rigidity as the aircraft reaction link 4 as a whole.

Furthermore, with the aircraft reaction link 4, the composite frame 69 is provided from the pair of linear portions 63 to the cylinder attachment portions 66, and therefore it is possible to achieve a further weight reduction. Also, the third through holes 70 passing through both the metal frame 68 and the composite frame 69 are provided in the cylinder attachment portions 66, and the bushes 14 for rotatably holding the pivot shafts 28 are fixed to both the metal frame 68 and the composite frame 69 in the third through holes 70. Accordingly, it is possible to realize a structure in which the aircraft reaction link 4 for which weight reduction has been achieved even for the cylinder attachment portions 66 can be supported relative to the pivot shafts 28 more stably.

Further, with the aircraft reaction link 4, the composite frame 69 is provided from the pair of linear portions 63 to the fulcrum shaft attachment portion 65, and therefore it is possible to achieve a further weight reduction. Also, the fourth through hole 71 passing through both the metal frame 68 and the composite frame 69 is formed in the fulcrum shaft attachment portion 65, and the bearing 13 for rotatably supporting the fulcrum shaft 27 is fixed to both the metal frame 68 and the composite frame 69 in the fourth through hole 71. Accordingly, it is possible to realize a structure in which the aircraft reaction link 4 for which weight reduction has been achieved even for the fulcrum shaft attachment portion 65 can be supported relative to the fulcrum shaft 27 more stably.

Although embodiments of the present invention have been described thus far, the present invention is not limited to the above-described embodiment, and various modifications may be made within the scope recited in the claims. For example, the following modifications are possible.

(1) The form of bonding between the metal frame and the composite frame, the shape of the frames, the number of the members constituting the frames, and so forth are not limited to those illustrated in Embodiments 1 to 4 above, and various modifications may be practiced. Further, the cross-sectional shapes of the metal frame and the composite frame as well are not limited to those illustrated in Embodiments 1 to 4 above, and various modifications may be practiced.

(2) Although Embodiments 1 to 4 above are described taking, as an example, fastening members each including a bolt and a nut as the fastening members that bond the metal frame and the composite frame together, an aircraft reaction link may be implemented that is provided with fastening members that bond the metal frame and the composite frame together using members other than bolts and nuts. Alternatively, an aircraft reaction link may be implemented in which the metal frame and the composite frame are bonded together by using an adhesive or by fusing the surface of the composite frame to the metal frame, without using a fastening member. In the case of bonding the metal frame and the composite frame together by fusing, the bonding strength between the metal frame and the composite frame may be increased by forming fine irregularities on the surface of the metal frame by blasting or the like.

(3) Although titanium alloy is described as an example of the raw material of the metal frame in Embodiments 1 to 4 above, this need not be the case; metallic materials other than titanium alloy can be widely used as the raw material of the metal frame. For example, the metal frame may be made of an iron-based material. In the case where an iron-based material is used as the raw material constituting the metal frame, the specific gravity of the metal frame will be increased as compared to the case where titanium alloy is used. However, with this configuration, an aircraft reaction link is configured in which an iron-based material, which has a higher modulus of longitudinal elasticity than titanium alloy, is used to form a metal frame, and the metal frame is bonded to a composite frame made of fiber-reinforced plastic. Accordingly, this aircraft reaction link, if desired strength and rigidity are secured, can achieve a further weight reduction as compared to the case where the metal frame made of titanium alloy is used.

(4) Although Embodiments 1 to 4 above are described taking, as an example, a case where the fulcrum shaft attachment portion of the reaction link body is provided with the bearing for rotatably holding the fulcrum shaft, this need not be the case; an aircraft reaction link may be implemented in which the fulcrum shaft attachment portion is provided with a bush serving as a cylindrical slidable member coming into slidable contact with the outer perimeter of the fulcrum shaft.

(5) Although Embodiments 1 and 2 are described, taking as an example, the aircraft reaction link in which the composite frame is bonded to the metal frame on inner lateral faces of the metal frame in the width direction in the pair of linear portions, this need not be the case. That is, an aircraft reaction link may be implemented in which the composite frame is bonded to the metal frame on outer lateral faces in the width direction in the pair of linear portions.

The present invention can be widely applied as an aircraft reaction link that can be as a constituent component of an actuator for driving a control surface of an aircraft, and that can be coupled pivotably to the control surface and a hydraulically driven cylinder attached to the control surface or to a horn arm member. The present invention is not limited to the above-described embodiments, and all modifications, applications and equivalents thereof that fall within the claims, for which modifications and applications would become apparent by reading and understanding the present specification, are intended to be embraced therein.

What is claimed is:

1. An aircraft reaction link as a constituent component of an actuator for driving a control surface of an aircraft is coupled to a hydraulically driven cylinder whose one end is attached pivotably to the control surface or to a horn arm member attached to the control surface, the aircraft reaction link comprising:
    a pair of linear portions disposed alongside each other and each extending linearly;
    a coupling portion connecting to one end of each of the pair of linear portions on the same side via a bent portion and extending so as to couple the one end of each of the pair of linear portions on the same side to each other;
    a fulcrum shaft attachment portion that is provided so as to protrude from a center portion of the coupling portion, the fulcrum shaft attachment portion is pivotably attachable to a fulcrum shaft for rotatably supporting the control surface; and
    a cylinder attachment portion that is provided as the other end of each of the pair of linear portions and pivotably attachable to the other end of the cylinder via a pivot shaft,
    wherein a metal frame that is made of a metallic material and is provided so as to extend across the coupling portion and the pair of linear portions and a composite frame made of fiber-reinforced plastic is provided so as to extend at least in the pair of linear portions are bonded together, whereby the pair of linear portions and the coupling portion are formed, and
    the metal frame is provided so as to extend from the fulcrum shaft attachment portion to the cylinder attachment portion.

2. The aircraft reaction link according to claim 1, wherein the metal frame and the composite frame are disposed overlapping in a width direction that is the direction in which the pair of linear portions are disposed alongside each other, and
    the composite frame is bonded to the metal frame provided in the pair of linear portions on inner lateral faces or outer lateral faces of the metal frame in the width direction.

3. The aircraft reaction link according to claim 2, wherein a first through hole that is shaped so as to pass through and communicate with the metal frame and the composite frame is formed in the cylinder attachment portion that is provided as the other end of each of the pair of linear portions, and
    a bearing for rotatably holding the pivot shaft or a cylindrical slidable member coming into slidable contact with an outer perimeter of the pivot shaft is fixed to the first through hole from the metal frame to the composite frame.

4. The aircraft reaction link according to claim 2, wherein the composite frame is provided so as to extend from the pair of linear portions via the coupling portion to the fulcrum shaft attachment portion,
    a second through hole that is shaped so as to pass through and communicate with the metal frame and the composite frame is formed in the fulcrum shaft attachment portion, and
    a bearing for rotatably holding the fulcrum shaft or a cylindrical slidable member coming into slidable contact with an outer perimeter of the fulcrum shaft is fixed to the second through hole from the metal frame to the composite frame.

5. The aircraft reaction link according to claim 1,
wherein the metal frame includes a metal pipe portion that is provided in the pair of linear portions and that is formed in the shape of a pipe having a hollow cross section, the composite frame includes a composite pipe portion that is provided in the pair of linear portions and that is formed in the shape of a pipe having a hollow cross section, and the metal pipe portion and the composite pipe portion are bonded together as a double tube in which one of the metal pipe portion and the composite pipe portion is disposed inside the other and an inner wall of the one of the metal pipe portion and the composite pipe portion is in close contact with an outer wall of the other.

6. The aircraft reaction link according to claim 1,
wherein the metal frame and the composite frame are disposed overlapping in at least a center portion in the longitudinal direction of the pair of linear portions in a thickness direction that is a direction perpendicular to a width direction that is a direction in which the pair of linear portions are disposed alongside each other and the longitudinal direction of the pair of linear portions.

7. The aircraft reaction link according to claim 6,
wherein a third through hole that is shaped so as to pass through and communicate with an end of each of the metal frame and the composite frame that are disposed overlapping each other in the width direction is formed in the cylinder attachment portion provided as the other end of each of the pair of linear portions, and a bearing for rotatably holding the pivot shaft or a cylindrical slidable member coming into slidable contact with an outer perimeter of the pivot shaft is fixed to the third through hole from the metal frame to the composite frame.

8. The aircraft reaction link according to claim 6,
wherein the composite frame is provided so as to extend from the pair of linear portions via the coupling portion to the fulcrum shaft attachment portion, a fourth through hole that is shaped so as to pass through and communicate with an end of each of the metal frame and the composite frame that are disposed overlapping in the width direction is formed in the fulcrum shaft attachment portion, and a bearing for rotatably holding the fulcrum shaft or a cylindrical slidable member coming into slidable contact with an outer perimeter of the fulcrum shaft is fixed to the fourth through hole from the metal frame to the composite frame.

9. The aircraft reaction link according to claim 1,
wherein the metal frame is made of an iron-based material.

* * * * *